(12) United States Patent
Gupta et al.

(10) Patent No.: US 11,947,983 B1
(45) Date of Patent: Apr. 2, 2024

(54) CUSTOMIZING DIGITAL CONTENT TUTORIALS BASED ON TOOL PROFICIENCY

(71) Applicant: Adobe Inc., San Jose, CA (US)

(72) Inventors: Subham Gupta, Roorkee (IN); Padmassri Chandrashekar, Bangalore (IN); Ankur Murarka, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/930,154

(22) Filed: Sep. 7, 2022

(51) Int. Cl.
*G06F 9/451* (2018.01)
*G06T 11/60* (2006.01)

(52) U.S. Cl.
CPC .............. *G06F 9/453* (2018.02); *G06T 11/60* (2013.01)

(58) Field of Classification Search
CPC ........................................................ G06F 8/61
See application file for complete search history.

(56) References Cited

U.S. PATENT DOCUMENTS

| | | | | |
|---|---|---|---|---|
| 10,831,516 | B1 * | 11/2020 | Gupta | H04N 9/73 |
| 2004/0063085 | A1 * | 4/2004 | Ivanir | G09B 7/08 |
| | | | | 434/307 R |
| 2009/0222858 | A1 * | 9/2009 | Hjelm | H04N 21/632 |
| | | | | 725/47 |
| 2016/0349978 | A1 * | 12/2016 | Gonsalves | G06Q 10/10 |
| 2019/0274565 | A1 * | 9/2019 | Soli | G06F 3/016 |
| 2021/0118325 | A1 * | 4/2021 | Gupta | G09B 19/00 |
| 2021/0182087 | A1 * | 6/2021 | Park | G06F 3/0481 |
| 2022/0392366 | A1 * | 12/2022 | Chakraborti | G09B 5/00 |

* cited by examiner

*Primary Examiner* — Di Xiao
(74) *Attorney, Agent, or Firm* — Keller Preece PLLC

(57) ABSTRACT

Methods, systems, and non-transitory computer readable storage media are disclosed for customizing digital content tutorials for a user within a digital editing application based on user experience with editing tools. The disclosed system determines proficiency levels for a plurality of different portions of a digital content tutorial corresponding to a digital content editing task. The disclosed system generates tool proficiency scores associated with the user in a digital editing application in connection with the portions of the digital content tutorial. Specifically, the disclosed system generates the tool proficiency scores based on usage of tools corresponding to the portions. Additionally, the disclosed system generates a mapping for the user based on the tool proficiency scores associated with the user and the proficiency levels of the portions of the digital content tutorial. The disclosed system provides a customized digital content tutorial for display at a client device according to the mapping.

20 Claims, 14 Drawing Sheets

CUSTOMIZING DIGITAL CONTENT TUTORIALS BASED ON TOOL PROFICIENCY

BACKGROUND

Advancements in computer processing capabilities have led to an increase in the number and sophistication of tools for generating or modifying digital content in digital editing applications. For example, digital image editing applications include tools that simplify photo/image editing or performing advanced image editing tasks. Given the variety of operations that users can perform via the different tools available in digital content editing applications, learning to use editing tools on graphical user interfaces to perform the tasks can be difficult for new and inexperienced users. To address training users to use such editing tools, many entities provide video or other visual tutorials to instruct users on using the tools to achieve specific results. While such video or other tutorials provide assistance to users performing operations via digital editing applications, different users have different levels of experience with various tools. Accordingly, creating and presenting digital content tutorials that are efficient and instructive to different users is an important and often difficult aspect of digital content editing processes.

SUMMARY

This disclosure describes one or more embodiments of methods, non-transitory computer readable media, and systems that solve the foregoing problems (in addition to providing other benefits) by customizing digital content tutorials for a user within a digital editing application based on user experience with editing tools. The disclosed systems determine proficiency levels for a plurality of different portions of a digital content tutorial corresponding to a digital content editing task. The disclosed systems generate tool proficiency scores associated with the user in a digital editing application in connection with the portions of the digital content tutorial. Specifically, the disclosed systems generate the tool proficiency scores based on usage of tools corresponding to the portions. Additionally, the disclosed systems generate a mapping for the user based on the tool proficiency scores associated with the user and the proficiency levels of the portions of the digital content tutorial. The disclosed systems provide a customized digital content tutorial for display at a client device according to the mapping. The disclosed systems thus provide customized digital content tutorials for users based on the abilities/experience of the users with a digital editing application.

BRIEF DESCRIPTION OF THE DRAWINGS

Various embodiments will be described and explained with additional specificity and detail through the use of the accompanying drawings in which.

DETAILED DESCRIPTION

Figure 1:
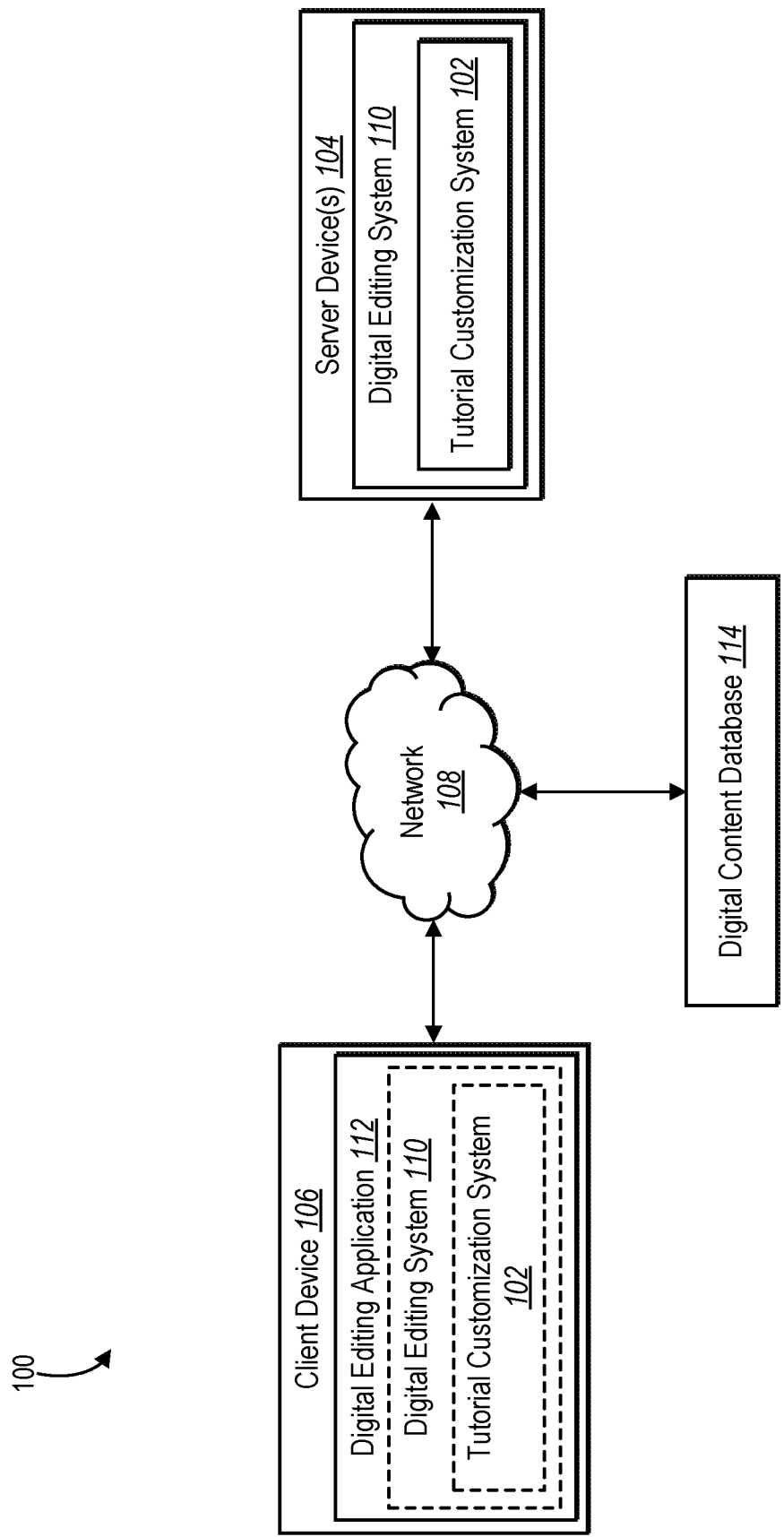
FIG. 1 illustrates an example system environment in which a tutorial customization system can operate in accordance with one or more implementations.

This disclosure describes one or more embodiments of a tutorial customization system that customizes digital content tutorials within digital editing applications based on proficiencies of users with tools of the digital editing applications. Specifically, the tutorial customization system determines proficiency levels associated with different portions of a multi-level digital content tutorial. Additionally, the tutorial customization system determines user proficiencies with tools associated with a digital editing application based on usage of the tools by a user. The tutorial customization system generates a customized digital content tutorial by selecting specific portions of the multi-level digital content tutorial according to the respective proficiency levels of the portions and the user proficiencies with the tools. The tutorial customization system thus generates, and provides for display, a customized digital content tutorial that includes portions relevant to a user's proficiency level with different tools in the digital editing application.

As mentioned, in one or more embodiments, the tutorial customization system determines proficiency levels of portions of a digital content tutorial associated with a digital editing application. In particular, the tutorial customization system determines one or more versions of a digital content tutorial including different tutorial content (e.g., text, images, video) for a plurality of portions of a digital content tutorial. The tutorial customization system also determines a proficiency level corresponding to thresholds for each version of the portions of the digital content tutorial.

In one or more embodiments, the tutorial customization system generates tool proficiency scores associated with a user of a client device. For example, the tutorial customization system determines usage by the user of a plurality of tools corresponding to the portions of the digital content tutorial. To illustrate, the tutorial customization system determines individual tool proficiencies for the user based on the number of times the user has used each tool, whether the user has used the tool correctly, or other indicators of a tool proficiency for the user. The tutorial customization system generates the tool proficiency scores for a particular portion of the digital content tutorial based on the individual tool proficiencies of tools corresponding to the portion.

According to one or more embodiments, the tutorial customization system generates a mapping for the user based on the tool proficiency scores associated with the user and the proficiency levels of the portions of the digital content tutorial. In particular, the tutorial customization system compares the tool proficiency scores of the user to the proficiency levels of the corresponding portions of the digital content tutorial. In response to determining that the tool proficiency scores meet (or do not meet) specific proficiency levels, the tutorial customization system selects specific versions of the different portions of the digital content tutorial.

In one or more additional embodiments, the tutorial customization system provides a customized digital content tutorial for display at a client device of the user. Specifically, the tutorial customization system determines a subset of the portions of the digital content tutorial according to the mapping by selecting versions of the portions that correspond to the user's proficiency with the corresponding tools. The tutorial customization system uses the selected versions of the portions to determine digital content to provide to the client device of the user within the digital editing application. Accordingly, different tool proficiency scores associated with different users results in different customized digital content tutorials provided to the users.

Conventional systems for editing digital content have a number of shortcomings in relation to efficiency and flexibility of operation. For example, conventional systems often provide tutorials for performing various operations in digital editing applications by selecting static tutorials to provide to a user. While some conventional systems can determine whether to provide a given tutorial for various reasons (e.g., based on previously providing the tutorial to a user), such conventional systems lack flexibility. In particular, the conventional systems are unable to provide different user experiences by modifying the content of the tutorials for the different users.

To address some of these issues, some conventional systems generate different tutorials for different user experiences. Specifically, the conventional systems require digital content creators to generate different full versions of tutorials that target users of different experience/proficiency levels. The conventional systems then allow users to select from the different versions of the tutorials for performing a given task based on their experience level. These conventional systems, however, lack flexibility because they still fail to account for users' different proficiency levels with different tools for performing a single task. This often requires users with varying levels of proficiency with the tools to view tutorials with too much detail or not enough detail according to their respective needs.

Additionally, the conventional systems lack efficiency by requiring tutorial creators to create additional (and often unneeded) content across a plurality of different tutorials. In particular, because the conventional systems apply or provide static, rigid tutorials to users, modifying the tutorials often requires content generators to recreate the tutorial from the beginning. Thus, changing existing tools or adding new tools in a given digital editing system can often require the content generators to generate entirely new tutorials due to the static nature of the tutorials.

The disclosed tutorial customization system provides a number of advantages over conventional systems. For example, the tutorial customization system improves the flexibility of computing systems that provide tutorials for performing tasks in digital editing applications. In contrast to conventional systems that provide static tutorials, the tutorial customization system dynamically/adaptively modifies digital content tutorials to tailor the tutorials to the needs and experience of each user. In particular, by tracking a user's usage of tools within a digital editing application and generating tool proficiency scores indicating a user's proficiency with specific tools in the digital editing application, the tutorial customization system can accurately map the user to specific versions of the different portions of the digital content tutorial that meet the user's needs. For example, because each version of a particular portion of a digital content tutorial is associated with a different proficiency level, the tutorial customization system selects the versions that most closely correspond to the user's proficiency level with tools that correspond to the particular portion.

The tutorial customization system also improves the efficiency of computing systems that provide digital content tutorials in digital editing applications. In contrast to conventional systems that serve static tutorials generalized to specific levels of proficiency for a particular task, the tutorial customization system provides dynamic/adaptive user assistance in a digital editing application utilizing a single customizable tutorial. For instance, by generating a single digital content tutorial that includes a plurality of portions with different versions of tutorial content providing assistance regarding a single aspect of a digital editing application, the tutorial customization system repurposes a single digital content tutorial into a plurality of different combinations that present different versions of different tutorial portions to different users according to their needs and experience, as measured by tool proficiency scores. Additionally, by combining a customizable digital content tutorial in a single package, the tutorial customization system provides easy access to individual portions/versions of the digital content tutorial for updating or replacing tutorial content. This further allows content generators to generate customizable tutorials with individually targeted portions, eliminating the need to generate unnecessary content providing instructions for performing a single task in a plurality of different full tutorials.

Additionally, the tutorial customization system provides real-time, dynamic customization of pre-generated digital content tutorials. Specifically, the tutorial customization system continuously monitors a user's usage of various tools (e.g., based on the user's selection and usage of each individual tool) in a digital editing application. Furthermore, in response to a user's selection of a given digital content tutorial within the digital editing application, the tutorial customization system accesses metadata associated with the selected digital content tutorial and uses the monitored usage of tools to dynamically customize the digital content tutorial in real-time to provide to the user. Additionally, because the tutorial customization system dynamically modifies digital content tutorials in real-time upon selection of the digital content tutorial by the user, the tutorial customization system efficiently customizes a pre-generated digital content tutorial to a user's needs based on the user's proficiency and without any additional intervention to update the digital content tutorial for the user.

Turning now to the figures, FIG. 1 includes an embodiment of a system environment 100 in which a tutorial customization system 102 is implemented. In particular, the system environment 100 includes server device(s) 104 and a client device 106 in communication via a network 108. Moreover, as shown, the server device(s) 104 include a digital editing system 110, which includes the tutorial customization system 102. Additionally, the client device 106 includes a digital editing application 112, which optionally includes the digital editing system 110 and the tutorial customization system 102. In one or more embodiments, as illustrated in FIG. 1, the system environment 100 also includes a digital content database 114 in communication with the server device(s) 104 and/or the client device 106.

As shown in FIG. 1, the server device(s) 104 includes or hosts the digital editing system 110. The digital editing system 110 includes, or is part of, one or more systems that implement digital content editing operations. For example, the digital editing system 110 provides tools for performing various operations on digital content (e.g., digital images, video, audio, or text from the digital content database 114). To illustrate, the digital editing system 110 communicates with the client device 106 via the network 108 to provide the tools for display and interaction via the digital editing application 112 at the client device 106. Additionally, in some embodiments, the digital editing system 110 receives data from the client device 106 in connection with editing digital content, including requests to access digital content stored at the server device(s) 104 (or at another device such as the digital content database 114) and/or requests to store digital content from the client device 106 at the server device(s) 104 (or at another device). In some embodiments, the digital editing system 110 receives interaction data for viewing, generating, or editing a digital content item from the client device 106, processes the interaction data (e.g., to view, generate, or edit a digital content item), and then provides the results of the interaction data to the client device 106 for display via the digital editing application 112 or to a third-party system.

According to one or more embodiments, the digital editing system 110 utilizes the tutorial customization system 102 to provide digital content tutorials in connection with editing digital content. In particular, the customizes the digital content tutorials in connection with utilizing the tools to modify digital content in one or more editing operations. For example, the tutorial customization system 102 customizes multi-level digital content tutorials including different versions of a plurality of portions for a user based on the user's expertise or proficiency with the tools of the digital editing application 112. The digital editing system 110 serves a customized digital content tutorial to the client device 106 (e.g., via the digital editing application 112) to assist a user of the client device 106 in using tools to edit digital content.

In one or more embodiments, a digital content tutorial includes tutorial content to assist in the use of one or more tools to perform a task for editing digital content within a digital editing application. For instance, a digital content tutorial includes tutorial content related to a particular digital content editing topic. Additionally, a digital content tutorial can include a plurality of separate subtopics related to the topic that provide assistance for a plurality of separate tasks for achieving an overall digital content editing operation. To illustrate, a digital content tutorial corresponding to improving color in a digital image can include tutorial content for separate sub-tasks related to modifying light, modifying color, mixing color, modifying a radial gradient, or improving detail that combine to improve the color of the digital image. In one or more additional embodiments, a digital content tutorial for formatting a document includes tutorial content for sub-tasks related to modifying text, modifying margins, or modifying page layouts.

In one or more embodiments, the server device(s) 104 include a variety of computing devices, including those described below with reference to FIG. 11. For example, the server device(s) 104 includes one or more servers for storing and processing data associated with editing digital content and customizing digital content tutorials. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images or digital text). In some embodiments, the client device 106 also performs functions for generating, capturing, or accessing data to provide to the digital editing system 110 and the tutorial customization system 102 in connection with editing digital content. For example, the client device 106 communicates with the server device(s) 104 via the network 108 to provide information (e.g., user interactions) associated with digital content (e.g., stored at the digital content database 114). Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the tutorial customization system 102 being implemented by a particular component and/or device within the system environment 100, the tutorial customization system 102 can be implemented, in whole or in part, by other computing devices and/or components in the system environment 100 (e.g., the client device 106).

In particular, in some implementations, the tutorial customization system 102 on the server device(s) 104 supports the tutorial customization system 102 on the client device 106. For instance, the server device(s) 104 generates or obtains the tutorial customization system 102 for the client device 106. The server device(s) 104 provides the tutorial customization system 102 to the client device 106 for performing a digital content tutorial customization process at the client device 106. In other words, the client device 106 obtains (e.g., downloads) the tutorial customization system 102 from the server device(s) 104. At this point, the client device 106 is able to utilize the tutorial customization system 102 to customize digital content tutorials for digital content editing tasks independently from the server device(s) 104.

In alternative embodiments, the tutorial customization system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital content editing operations or select a digital content tutorial, and, in response, the tutorial customization system 102 or the digital editing system 110 on the server device(s) 104 performs operations to modify digital content and/or customize digital content tutorials for digital content editing operations. The server device(s) 104 provide the output or results of the operations to the client device 106.

Figure 2:
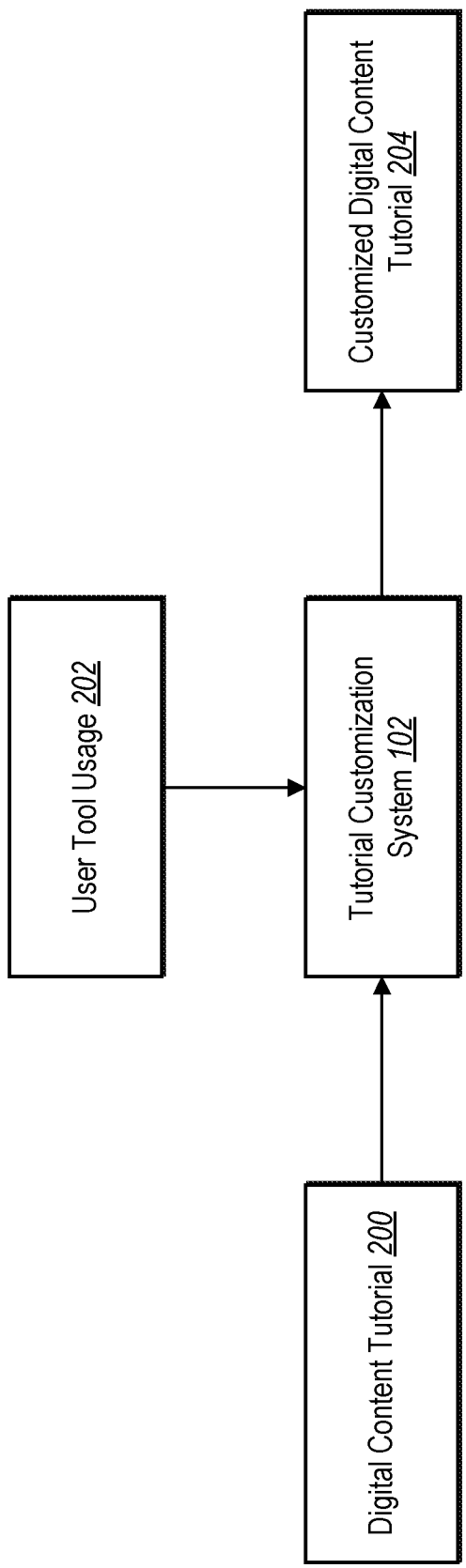
FIG. 2 illustrates a diagram of an overview of the tutorial customization system customizing a digital content tutorial in accordance with one or more implementations.

As mentioned, the tutorial customization system 102 customizes multi-level digital content tutorials according to user needs and experience. FIG. 2 illustrates an overview of the tutorial customization system 102 customizing a digital content tutorial based on user interactions with tools in a digital editing application. More specifically, FIG. 2 illustrates that the tutorial customization system 102 utilizes tool interactions by a user within the digital editing application to generate the customized digital content tutorial with selected versions of a plurality of portions of a digital content tutorial.

Figure 3:
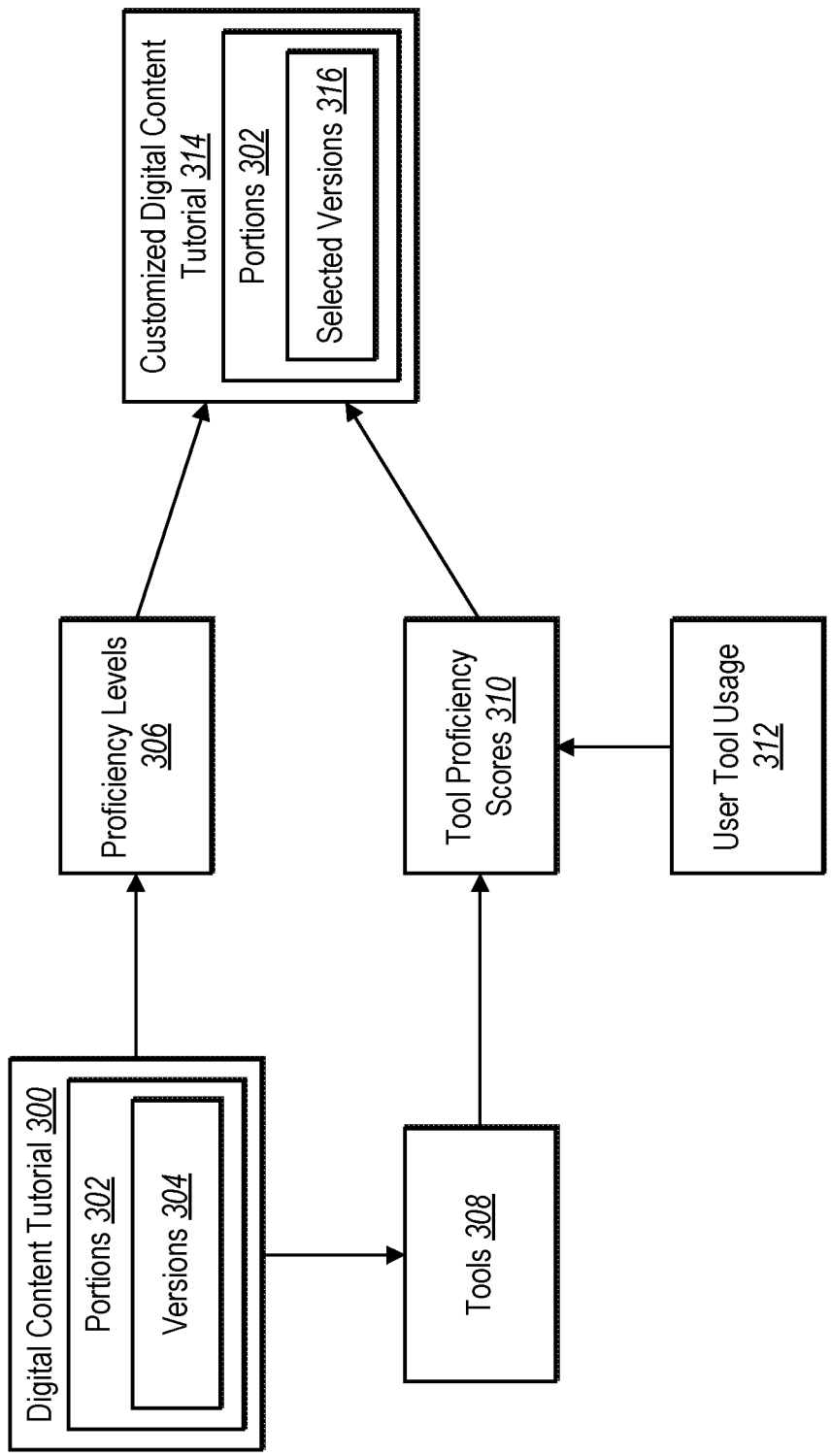
FIG. 3 illustrates a diagram of the tutorial customization system customizing a digital content tutorial based on user interactions with tools of a digital editing application in accordance with one or more implementations.
Figure 4:
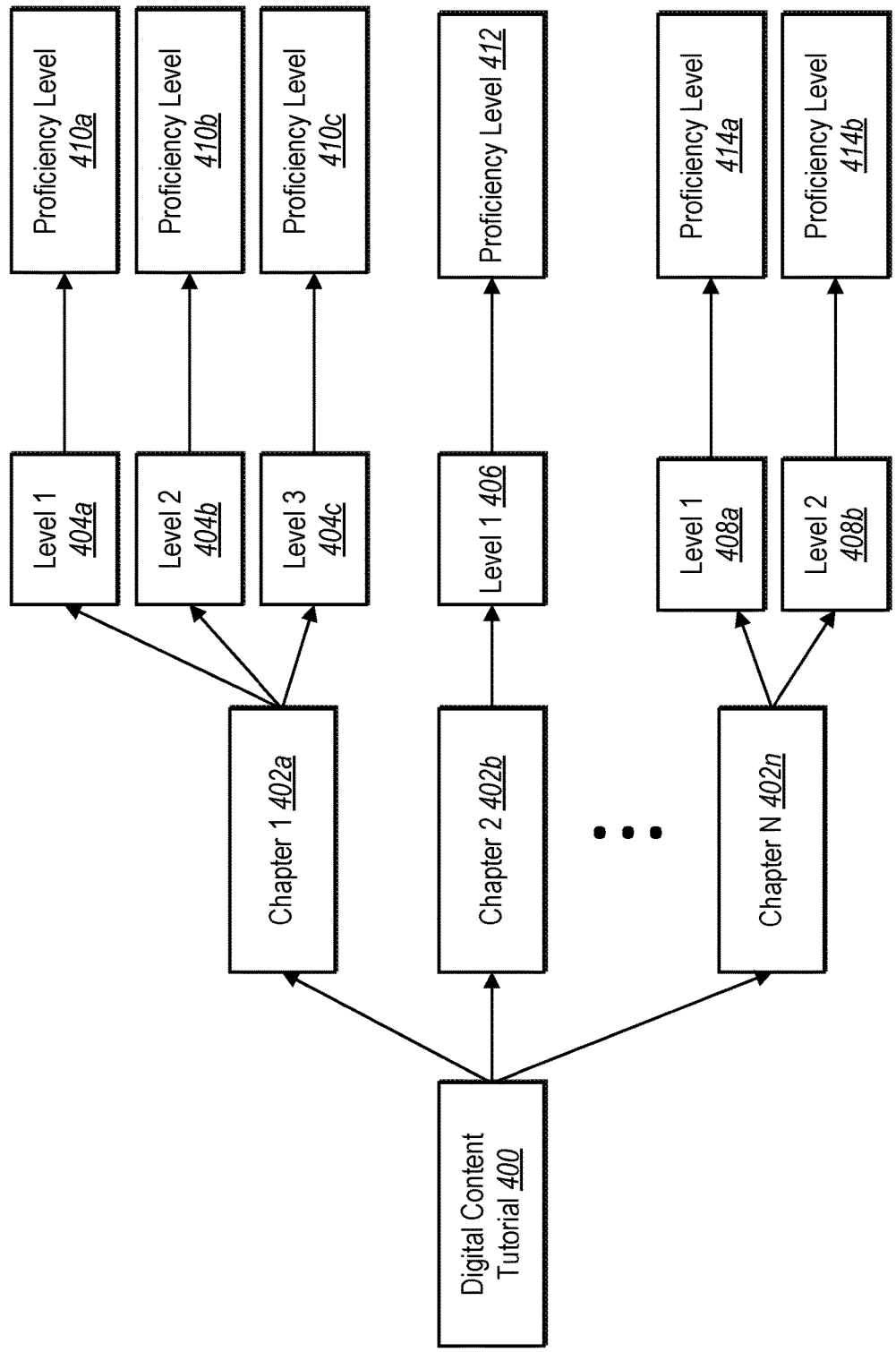
FIG. 4 illustrates a diagram of the tutorial customization system determining proficiency levels of a plurality of different portions of a digital content tutorial in accordance with one or more implementations.

In one or more embodiments, the tutorial customization system 102 identifies a digital content tutorial 200 including tutorial content to assist a user in performing a particular task (or set of related tasks) within a digital editing application. In particular, as previously mentioned, the digital content tutorial 200 includes a plurality of different portions corresponding to subtopics corresponding to a broad topic. Accordingly, the tutorial customization system 102 determines a plurality of portions of the digital content tutorial 200 corresponding to the separate subtopics, each of which may have a plurality of different versions targeting users of different experience/proficiency via specific proficiency levels. FIGS. 3 and 4 and the corresponding description provide additional detail with respect to determining portions of a digital content tutorial and corresponding proficiency levels of the portions of the digital content tutorial.

Figure 5:
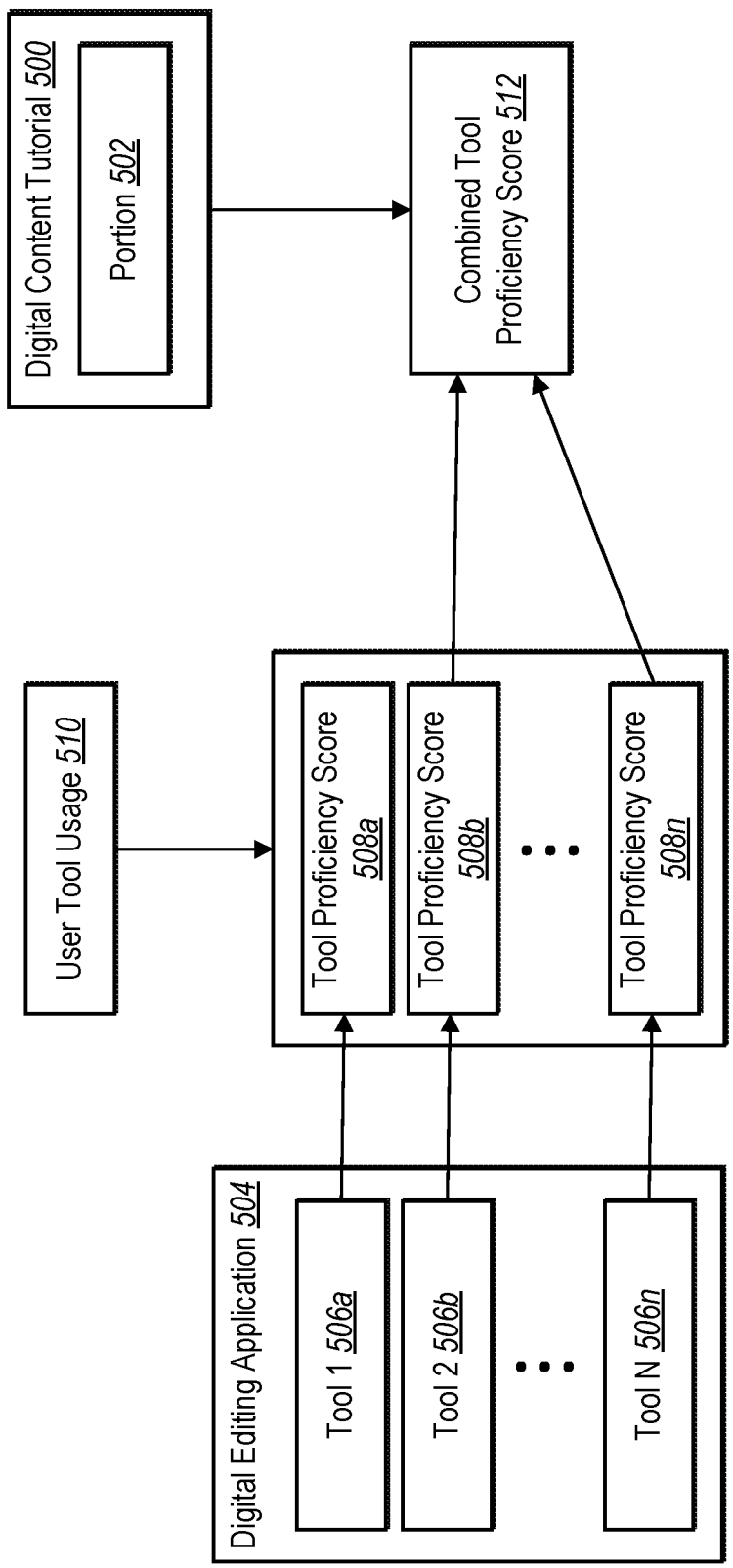
FIG. 5 illustrates a diagram of the tutorial customization system generating a tool proficiency score associated with a user based on usage of tools in a digital editing application in accordance with one or more implementations.

According to one or more embodiments, the tutorial customization system 102 determines a user tool usage 202 in connection with a plurality of tools associated with the digital content tutorial 200. Specifically, the tutorial customization system 102 utilizes a tool usage history associated with the user (e.g., via a user account) to determine a tool proficiency of the user with each of a plurality of tools associated with the digital content tutorial 200. The tutorial customization system 102 determines a tool proficiency (e.g., by generating tool proficiency scores) for the user for each tool associated with the digital content tutorial 200. FIGS. 3 and 5 and the corresponding description provide additional detail with respect to determining tool proficiencies for a user.

Figure 6:
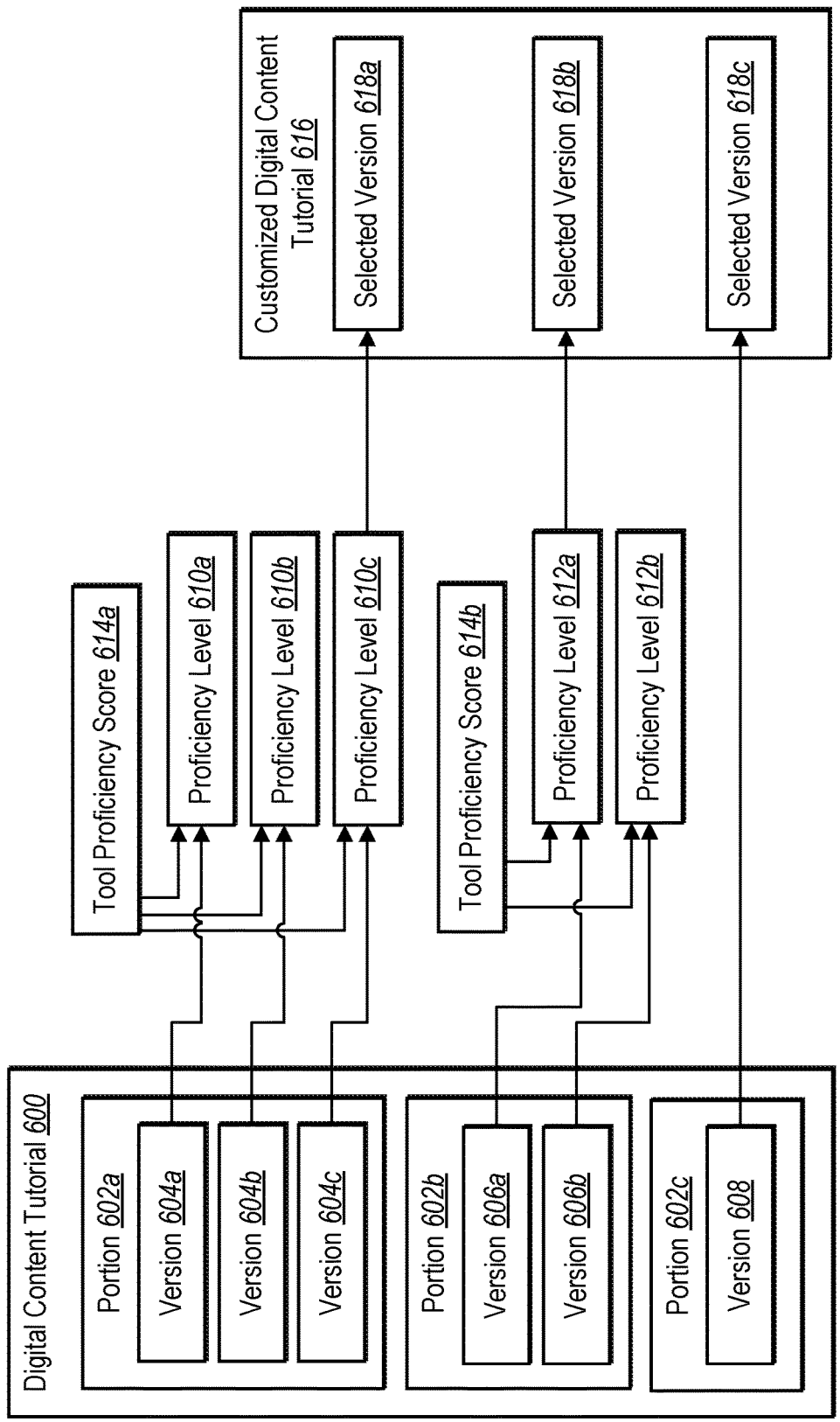
FIG. 6 illustrates a diagram of the tutorial customization system generating a customized digital content tutorial by selecting specific versions of different portions of a digital content tutorial in accordance with one or more implementations.

In response to determining tool proficiencies for the user for a plurality of tools, the tutorial customization system 102 generates a customized digital content tutorial 204 for the user. In particular, the tutorial customization system 102 utilizes the tool proficiencies of the user based on the user tool usage 202 to select specific portions of the digital content tutorial 200 to provide to the user. Accordingly, the tutorial customization system 102 dynamically constructs the customized digital content tutorial 204 in real-time (e.g., in response to a request by the user to view the digital content tutorial 200). FIGS. 3 and 6 and the accompanying description provide additional detail with respect to generating a customized digital content tutorial for a plurality of portions of a digital content tutorial based on user proficiency.

As mentioned, FIG. 3 illustrates the tutorial customization system 102 generate a customized digital content tutorial based on user proficiency. In one or more embodiments, the tutorial customization system 102, as illustrated in FIG. 3, the tutorial customization system 102 determines that a digital content tutorial 300 includes a plurality of portions 302 for presenting various steps in a process to perform a digital content editing task. For example, the tutorial customization system 102 extracts the portions 302 from metadata associated with the digital content tutorial 300 (e.g., stored with one or more files including tutorial content for the digital content tutorial 300).

Additionally, as FIG. 3 illustrates, the portions 302 of the digital content tutorial 300 include a plurality of versions 304 (e.g., each portion includes one or more distinct versions) of tutorial content for performing various sub-tasks of the digital content editing task. The tutorial customization system 102 also extracts the versions 304 associated with each of the portions 302 from the metadata of the digital content tutorial 300. In one or more embodiments, different versions of tutorial content for a single portion of the digital content tutorial 300 include tutorial content targeting different audiences (e.g., users of different experience/proficiency levels). Accordingly, different versions of a portion include different amounts or types of tutorial content for assisting users of different experience levels with performing the same digital content editing task.

Furthermore, as illustrated in FIG. 3, the tutorial customization system 102 determines proficiency levels 306 of the portions 302 of the digital content tutorial 300. In one or more embodiments, the proficiency levels 306 indicate recommended user proficiencies for performing the tasks associated with the portions 302 of the digital content tutorial 300. For example, a proficiency level for a portion includes a threshold value indicating a minimum recommended proficiency for tutorial content in a specific version of the portion. Thus, versions with higher proficiency levels include tutorial content targeting more experienced users while versions with lower proficiency levels include tutorial content targeting less experienced users.

In one or more embodiments, the tutorial customization system 102 generates tool proficiency scores 310 indicating user proficiencies with tools 308 identified for the portions 302 of the digital content tutorial 300. Specifically, the tutorial customization system 102 generates the tool proficiency scores 310 to indicate how experienced or proficient a user is with each of the tools 308 within a digital editing application. The tutorial customization system 102 generates scores on a predetermined scale that indicate the user's proficiency with tools corresponding to a particular portion. To illustrate, as mentioned previously, the tutorial customization system 102 generates the tool proficiency scores 310 for the tools 308 based on user tool usage 312 associated with a user.

In one or more embodiments, each of the portions 302 has a specific set of tools for performing digital content editing operations that the tutorial customization system 102 determines for the digital content tutorial 300. For example, the tutorial customization system 102 extracts identifiers for the tools 308 associated with the portions 302 from the metadata associated with the digital content tutorial 300. The tutorial customization system 102 utilizes the user tool usage 312 to generate the tool proficiency scores 310 according to the tools that correspond to each of the portions 302 of the digital content tutorial 300.

According to one or more embodiments, the tutorial customization system 102 generates a customized digital content tutorial 314 based on the proficiency levels 306 and the tool proficiency scores 310. In particular, the tutorial customization system 102 generates the customized digital content tutorial 314 by determining selected versions 316 of the portions 302. For example, the tutorial customization system 102 utilizes the tool proficiency scores 310 of the user to select one or more versions of the portions 302 that correspond to the user's proficiency. Accordingly, the tutorial customization system 102 generates the customized digital content tutorial 314 by determining the selected versions 316 based on tutorial content that most likely corresponds to a user's level of expertise.

As mentioned, FIG. 4 illustrates the tutorial customization system 102 determining proficiency levels for portions of a digital content tutorial. Specifically, the tutorial customization system 102 determines a digital content tutorial 400 that includes multi-level portions for providing assistance to a user within a digital editing application in connection with a topic. For example, the tutorial customization system 102 determines that the digital content tutorial 400 includes a plurality of chapters 402a-402n corresponding to different subtopics associated with the topic. To illustrate, as mentioned, in response to determining that the digital content tutorial 400 corresponds to a tutorial for improving the color of a digital image, the chapters 402a-402n correspond to different tasks (e.g., modifying light, selecting color, mixing color, modifying a radial gradient, or detailing color) that result in improving the color of the digital image.

In one or more embodiments, the tutorial customization system 102 determines a plurality of different versions associated with one or more of the portions of the digital content tutorial 400. For instance, as illustrated in FIG. 4, the tutorial customization system 102 determines that one or more of the chapters 402a-402n includes a plurality of different versions (e.g., levels) including different tutorial content corresponding to the chapters 402a-402n. To illustrate, a first chapter 402a includes three levels 404a-404c corresponding to tutorial content targeting users of different experience. Additionally, as illustrated, a second chapter 402b includes level 406. Furthermore, an nth chapter 402n includes two levels 408a-408b.

In some embodiments, a portion of a digital content tutorial includes any number of levels intended for users of various experience levels. In one or more embodiments, a content generator (e.g., a user) creates each of the separate levels for a particular chapter based on the experience/proficiency of target users. For example, the number of levels of a particular portion of a digital content tutorial depend on the complexity of the corresponding task (or sub-task), the number of tools required to perform the task, or the variability of tool properties (e.g., settings associated with the tools). Accordingly, a digital content tutorial can include a large number of different possible combinations of tutorial content due to a plurality of portions each having one or more different versions from which the tutorial customization system 102 selects.

According to one or more embodiments, a version of a portion of a digital content tutorial includes one or more steps including tutorial content related to performing a particular digital content editing task. For instance, a first level 404a of the first chapter 402a includes ten steps related to performing a digital content editing task and targets a beginner level of user experience/proficiency. Additionally, a second level 404b of the first chapter 402a includes six steps related to performing the digital content editing task and targets an intermediate level of user experience/proficiency. Furthermore, a third level 404c of the first chapter 402a includes 3 steps related to performing the digital content editing task and targets an expert level of user experience/proficiency.

Additionally, in one or more embodiments, each version of a portion of a digital content tutorial includes tutorial content for providing assistance to a user in connection with performing a digital content editing task. Specifically, a particular version includes digital content such as digital text, one or more digital images, digital video, digital audio, or a combination of two or more types of digital content. Accordingly, the number of steps in a particular version of a portion of a digital content tutorial can affect the amount or type of digital content presented during execution of the digital content tutorial. To illustrate, the first level 404a of the first chapter 402a includes a first set of digital content, and the second level 404b of the first chapter 402a includes a second set of digital content different than the first set of digital content.

In one or more embodiments, as illustrated in FIG. 4, the tutorial customization system 102 determines proficiency levels for portions of the digital content tutorial 400. For example, the tutorial customization system 102 determines a first set of proficiency levels 410a-410c corresponding to the levels 404a-404c of the first chapter 402a, a proficiency level 412 corresponding to the level 406 of the second chapter 402b, and an nth set of proficiency levels 414a-414b corresponding to the levels 408a-408b of the nth chapter 402n. To illustrate, the tutorial customization system 102 determines a first proficiency level 410a for the first level 404a of the first chapter 402a, a second proficiency level 410b for the second level 404b of the first chapter 402a, and a third proficiency level 410c for the third level 404c of the first chapter 402a.

According to one or more embodiments, the proficiency levels for different versions of a portion of a digital content tutorial include threshold values corresponding to required or recommended proficiencies of users to view the respective versions. Accordingly, given that the first level 404a, the second level 404b, and the third level 404c are intended for users with different experience/proficiency, the tutorial customization system 102 determines that the corresponding proficiency levels include values corresponding to the respective proficiencies. In one or more embodiments, the tutorial customization system 102 determines that the first proficiency level 410a has a value lower than the second proficiency level 410b and the third proficiency level 410c. Additionally, the tutorial customization system 102 determines that the third proficiency level 410c has a value higher than the first proficiency level 410a and the second proficiency level 410b.

In one or more embodiments, the proficiency levels for versions of different portions of a digital content tutorial include values on a predetermined scale. For instance, the proficiency levels include decimal values on a scale from 0 to 1. To illustrate, the first proficiency level 410a includes a value of 0.0, the second proficiency level 410b includes a value of 0.4, and the third proficiency level 410c includes a value of 0.75. Accordingly, the proficiency levels set a plurality of different thresholds for determining whether to select a particular version based on the user's proficiency. In at least some embodiments, the tutorial customization system 102 determines default values of proficiency levels for different portions of a digital content tutorial such that all users meet at least the thresholds for selecting a first version of a particular portion of the digital content tutorial.

In one or more embodiments, as mentioned, the tutorial customization system 102 extracts information about a digital content tutorial from metadata associated with the digital content tutorial. For example, the tutorial customization system 102 extracts information about individual portions, versions, and/or proficiency levels from the metadata associated with the digital content tutorial. To illustrate, the tutorial customization system 102 extracts the information about the digital content tutorial from metadata in a JavaScript Object Notation ("JSON") file (or other metadata structure) associated with a digital content tutorial that includes a list of portions, versions of each portion, steps associated with each version, and proficiency levels associated with each portion.

As an example, metadata for a digital content tutorial includes a "proc_list" that includes a list of portions (e.g., chapters) in the digital content tutorial. Additionally, within each chapter, the metadata includes a "proc_name" indicating a name of the chapter (e.g., "Chapter/1=Light"), "proc_tools" indicating a list of tools used in the chapter (e.g., ["whites", "blacks", "highlights"), and "proc_level_xx" indicating a map of information related to a version (e.g., a level) within a chapter. Furthermore, the metadata includes, within the map of information related to a level, "proc_level_threshold" indicating a proficiency level for the level within [0,1] and "proc_step_list" indicating steps and/or content corresponding to each step in the level. Although the above example, includes specific fields and field names in metadata associated with a digital content tutorial, metadata associated with a digital content tutorial can include more, fewer, or different fields with different field names.

FIG. 5 illustrates the tutorial customization system 102 generating a tool proficiency score for a user in connection with a digital content tutorial. In particular, the tutorial customization system 102 determines that a digital content tutorial 500 includes a portion 502 related to a specific topic. For example, the portion 502 includes one or more versions including tutorial content to assist a user in completing a task corresponding to the specific topic of the portion 502 within a digital editing application 504. To illustrate, the digital editing application 504 includes a digital image editing application or digital text editing application for generating and modifying digital images or digital text.

In one or more embodiments, the tutorial customization system 102 determines tools 506a-506n associated with the digital editing application 504. For example, the tutorial customization system 102 identifies all tools available within the digital editing application 504. Specifically, the tutorial customization system 102 determines a first tool 506a for performing a first operation within the digital editing application 504, a second tool 506b for performing a second operation within the digital editing application 504, etc. To illustrate, the tools perform operations including, but not limited to, various image color modifications, object manipulation, text creation/modification, etc.

In connection with determining the tools 506a-506n of the digital editing application 504, the tutorial customization system 102 also generates tool proficiency scores 508a-508n indicating a proficiency of a user with the tools 506a-506n. In one or more embodiments, as previously mentioned, the tutorial customization system 102 determines user tool usage 510 associated with the user. For instance, the tutorial customization system 102 accesses a user account of the user to determine the user tool usage 510. Alternatively, the tutorial customization system 102 determines the user tool usage 510 based on stored information for the tools 506a-506n at a client device of the user.

In one or more embodiments, the tutorial customization system 102 generates the tool proficiency scores 508a-508n based on a number of times the user has used each of the tools 506a-506n. For example, the tutorial customization system 102 utilizes a proficiency score algorithm to generate a tool proficiency score for a particular tool according to the user's usage of the tool. To illustrate, the tutorial customization system 102 generates a first tool proficiency score 508a for the first tool 506a based on the user's past usage of the first tool 506a within the digital editing application 504. According to one or more embodiments, the tutorial customization system 102 utilizes the proficiency score algorithm below to generate each tool proficiency score.

$$\text{proficiency}(T) = \begin{cases} 0, & n_T < m_T \\ \dfrac{k_T}{n_T}, & n_T \geq m_T \end{cases}$$

in which $k_T$ represents the number of times tool T was used correctly by the user, $n_T$ represents the total number of times tool T was used by the user, and $m_T$ represents the number of times tool T should be used to become eligible for determining whether the user is proficient.

In one or more embodiments, the tutorial customization system 102 determines the number of times a user has used a particular tool correctly by communicating with the digital editing application 504. For example, the tutorial customization system 102 determines that the user has used the first tool 506a n number of times within the digital editing application 504. Additionally, the tutorial customization system 102 determines how many times the user has used the first tool 506a correctly based on an application-specific determination of correct usage. To illustrate, the tutorial customization system 102 communicates with the digital editing application 504 to determine that the user used the first tool 506a k number of times based on whether the user set properties of the first tool 506a within a specific range of values (e.g., setting a brightness for a digital image between 0.4 and 0.6), whether the user performed an "undo" operation immediately after using the first tool 506a, or other data indicative of correct tool usage.

In one or more embodiments, the tutorial customization system 102 further determines a minimum number of uses before calculating a tool proficiency score for a particular tool for a user. Specifically, as indicated above with respect to the proficiency score algorithm, the tutorial customization system 102 determines a ratio of correct uses of a tool relative to total uses of the tool for a user in response to determining that the usage of the tool meets the minimum threshold. Alternatively, in response to determining that the number of tool uses does not meet the minimum threshold, the tutorial customization system 102 determines the tool proficiency score as zero (or other minimum value). Accordingly, the tutorial customization system 102 only calculates the tool proficiency score as a value other than zero if the user has used the corresponding tool at least a predetermined number of times.

In alternative embodiments, the tutorial customization system 102 utilizes other methods of determining user proficiency with tools in a digital editing application. For example, the tutorial customization system 102 determines a proficiency of a user with a particular tool or set of tools via monitoring user behavior within the digital editing application in connection with specific tasks. To illustrate, the tutorial customization system 102 utilizes data associated with a tool in a plurality of groups of tools to determine whether the user is proficient with the tool under different circumstances. Thus, the tutorial customization system 102 can determine different tool proficiencies for tools in different contexts associated with the tool.

In additional embodiments, as illustrated in FIG. 5, the tutorial customization system 102 utilizes the tool proficiency scores 508a-508n to generate a combined tool proficiency score 512 for the in connection with the portion 502. Specifically, the tutorial customization system 102 generates the combined tool proficiency score 512 based on a plurality of tool proficiency scores of tools corresponding to the portion 502. For instance, the tutorial customization system 102 determines which tools are associated with the portion 502. In one or more embodiments, the tutorial customization system 102 generates the combined tool proficiency score 512 by averaging the tool proficiency scores for the corresponding tools, as in the algorithm below.

$$\text{proficiency}(Ch_i) = \frac{\sum_{j=0}^{n} \text{proficiency}(T_{i,j})}{n}$$

in which i represents the portion of the digital content tutorial (e.g., the chapter number), n represents the number of tools corresponding to the portion, and $T_{i,j}$ represents the jth tool in portion i.

To illustrate, the tutorial customization system 102 generates the combined tool proficiency score 512 by averaging a second tool proficiency score 508b corresponding to the second tool 506b and an nth tool proficiency score 508n corresponding to the nth tool 506n. As an example for a chapter of a digital content tutorial corresponding to "Light" tutorial content with tools including "whites," "blacks," and "highlights," the tutorial customization system 102 determines that the tool proficiency scores for the tools are 0.7, 0.3, and 0.8, respectively. The tutorial customization system 102 generates the combined tool proficiency as:

$$\text{proficiency}(\text{Light}) = \frac{0.7 + 0.3 + 0.8}{3} = 0.6.$$

In one or more additional embodiments, the tutorial customization system 102 updates the tool proficiency scores for tools in response to usage of the tools by a user. Specifically, the tutorial customization system 102 detects usage of a particular tool by a user and updates the corresponding tool proficiency score in real-time. Accordingly, each time the user utilizes a given tool associated with a portion of a digital content tutorial, the tutorial customization system 102 updates the tool proficiency score for the tool and the combined tool proficiency score corresponding to the portion. The tutorial customization system 102 thus determines whether to provide a specific version of the portion in response to the updated combined tool proficiency score.

In some embodiments, the tutorial customization system 102 weights tool proficiency scores to generate a combined tool proficiency score. In particular, the tutorial customization system 102 determines that one or more tools associated with a portion of a digital content tutorial are more important for indicating proficiency relative to the tutorial content of the portion than others. Accordingly, the tutorial customization system 102 applies different weights to the tool proficiency scores according to the respective importance. Thus, higher proficiency with respect to a lower weighted tool makes less of a difference to the combined tool proficiency score than higher proficiency with respect to a higher weighted tool. To illustrate, weighting tools in a "Color" chapter can result in a higher weight applied to a "tone curve" tool and a lower weight to "temperature" and "profile" tools. In one or more embodiments, the tutorial customization system 102 utilizes weights to onboard users to new tools by applying higher weights to newer tools than to older tools.

FIG. 6 illustrates the tutorial customization system 102 utilizing tool proficiency scores associated with a user to customize a digital content tutorial based on proficiency levels corresponding to various versions of portions of the digital content tutorial. In one or more embodiments, the tutorial customization system 102 determines a digital content tutorial 600 including three separate portions related to different sub-tasks of for performing a digital content editing task. For example, the tutorial customization system 102 determines a first portion 602a, a second portion 602b, and a third portion 602c of the digital content tutorial 600.

Additionally, the tutorial customization system 102 determines one or more versions for each of the portions. Specifically, as illustrated in FIG. 6, the first portion 602a includes a plurality of versions 604a-604c including different tutorial content related to a first sub-task associated with the digital content tutorial 600. The second portion 602b includes a plurality of versions 606a-606b including different tutorial content related to a second sub-task associated with the digital content tutorial 600. The third portion 602c includes a version 608 including tutorial content related to a third sub-task associated with the digital content tutorial 600.

FIG. 6 also illustrates that the tutorial customization system 102 determines proficiency levels for the versions of the portions 602a-602c of the digital content tutorial 600. For example, the tutorial customization system 102 determines proficiency levels 610a-610c for the versions 604a-604c corresponding to the first portion 602a. The tutorial customization system 102 also determines proficiency levels 612a-612b for the versions 606a-606b corresponding to the second portion 602b. Although the tutorial customization system 102 may determine a proficiency level for the version 608 of the third portion 602c, because the third portion 602c includes a single version, the tutorial customization system 102 may alternatively skip the proficiency level for the third portion 602c.

According to one or more embodiments, the tutorial customization system 102 determines tool proficiency scores for the user in connection with the portions of the digital content tutorial 600. Specifically, the tutorial customization system 102 generates a first tool proficiency score 614a corresponding to the first portion 602a based on usage of tools corresponding to the first portion 602a. Additionally, the tutorial customization system 102 generates a second tool proficiency score 614b corresponding to the second portion 602b based on usage of tools corresponding to the second portion 602b. In one or more additional embodiments, the tutorial customization system 102 skips determining a tool proficiency score in connection with the third portion 602c based on the third portion 602c having a single version.

As illustrated in FIG. 6, the tutorial customization system 102 generates a customized digital content tutorial 616 based on the proficiency levels and tool proficiency scores. In particular, the tutorial customization system 120 compares the tool proficiency scores to the proficiency levels to determine which version of each portion of the digital content tutorial 600 to select. For example, the tutorial customization system 102 compares the first tool proficiency score 614a to the proficiency levels 610a-610c associated with the different versions of the first portion 602a-602c of the digital content tutorial 600.

To illustrate, in response to determining that the first tool proficiency score 614a meets the thresholds indicated by each of the proficiency levels 610a-610c, the tutorial customization system 102 selects the third version 604c of the first portion 602a as a first selected version 618a for the customized digital content tutorial 616. Additionally, in response to determining that the second tool proficiency score 614b does meets a proficiency level 612a of a first version 606a of the second portion 602b but not a proficiency level 612b of a second version 606b of the second portion 602b, the tutorial customization system 102 selects the first version 606a as a second selected version 618b for the customized digital content tutorial 616. Furthermore, because the tutorial customization system 102 determines that the third portion 602c only has the version 608, the tutorial customization system 102 selects the version 608 as a third selected version 618c for the customized digital content tutorial 616.

In one or more embodiments, the tutorial customization system 102 compares tool proficiency scores to proficiency levels in an order of lowest proficiency level first. For instance, the tutorial customization system 102 compares the first tool proficiency score 614a to a first proficiency level 610a with a lowest threshold value for the first portion 602a. In response to determining that the first tool proficiency score 614a meets the first proficiency level 610a, the tutorial customization system 102 proceeds to compare the first tool proficiency score 614a to a second proficiency level 610b. The tutorial customization system 102 thus continues comparing the first tool proficiency score 614a to each of the proficiency levels until identifying a proficiency level that the first tool proficiency score 614a does not meet (if any) and stops the comparison process. Accordingly, the tutorial customization system 102 selects the version with the highest proficiency level that the tool proficiency level meets.

According to one or more embodiments, to generate a customized digital content tutorial, the tutorial customization system 102 generates a mapping based on the tool proficiency scores of the user and proficiency levels corresponding to versions of portions of a digital content tutorial. In particular, the tutorial customization system 102 maps a user (e.g., a user account or client device) to a set of versions corresponding to a plurality of portions of a digital content tutorial. To illustrate, the tutorial customization system 102 generates, for a digital content tutorial including five different portions (e.g., chapters), a first mapping for a first user including a first version (e.g., beginner level) of all portions of the digital content tutorial according to the first user's tool proficiency scores. Additionally, the tutorial customization system 102 generates a second mapping for a second user including a second version of a third portion, a third version of a fourth portion, and first versions of all other portions of the digital content tutorial according to the second user's tool proficiency scores.

Figure 7A:
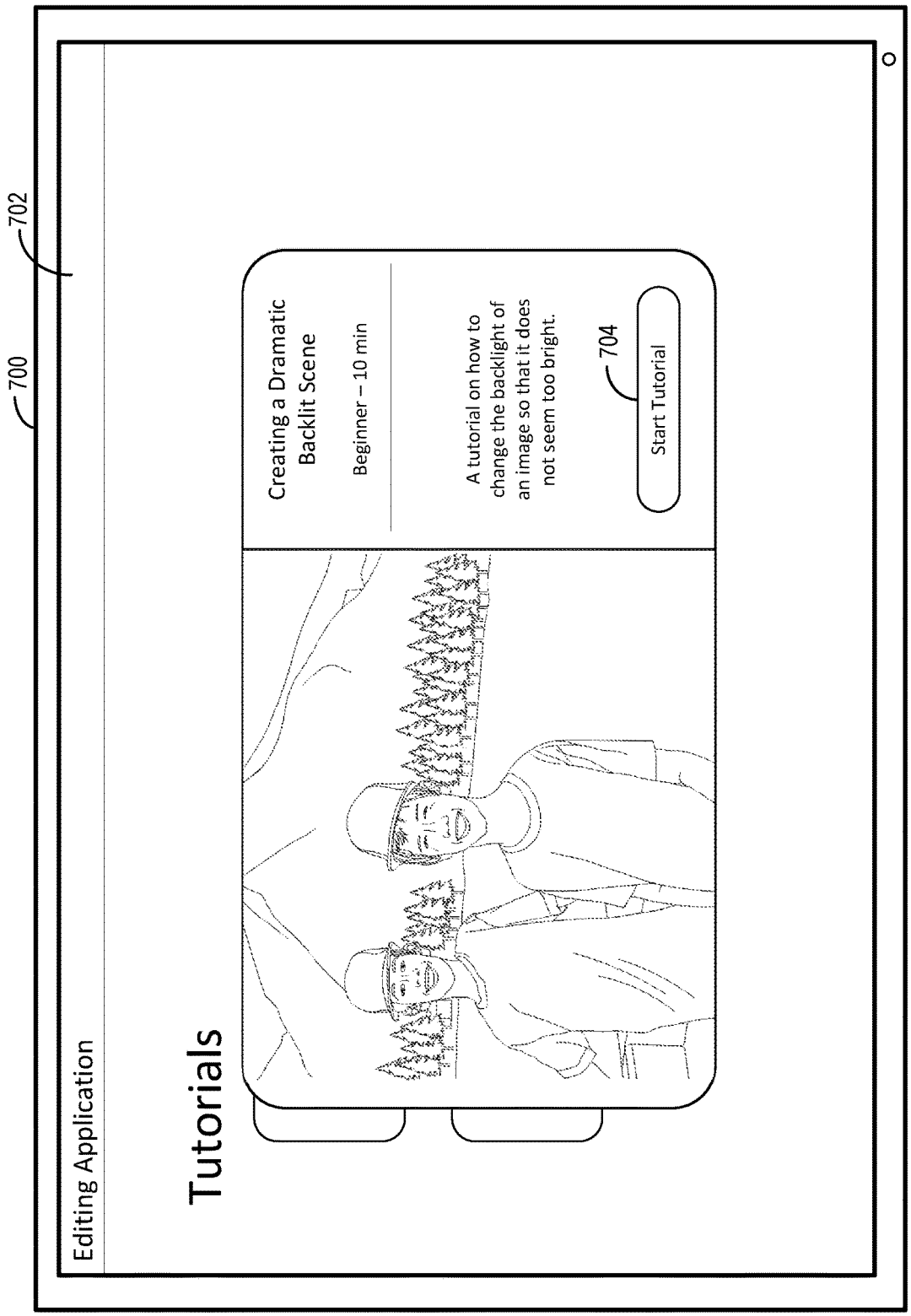
FIGS. 7A-7D illustrate graphical user interfaces for providing a customized digital content tutorial for a user in accordance with one or more implementations.

In one or more embodiments, the tutorial customization system 102 provides digital content tutorials for editing digital content to a client device. FIGS. 7A-7D illustrate graphical user interfaces for providing a customized digital content tutorial in connection with editing digital content. Specifically, FIG. 7A illustrates a graphical user interface of a client device 700 including a digital editing application 702 (e.g., a digital image application) for editing digital content. Additionally, the tutorial customization system 102 generates customized digital content tutorials for assisting a user in performing one or more digital content editing tasks.

In one or more embodiments, the client device 700 displays a plurality of digital content tutorials from which a user can select for viewing within the digital editing application 702. For example, the client device 700 displays a list of digital content tutorials for teaching the user to perform a variety of digital content editing operations such as modifying colors or lighting in a digital image. Additionally, in response to a selection of a digital content tutorial within the list displayed in the digital editing application 702, the client device displays an option 704 to initiate the selected digital content tutorial.

Figure 7B:
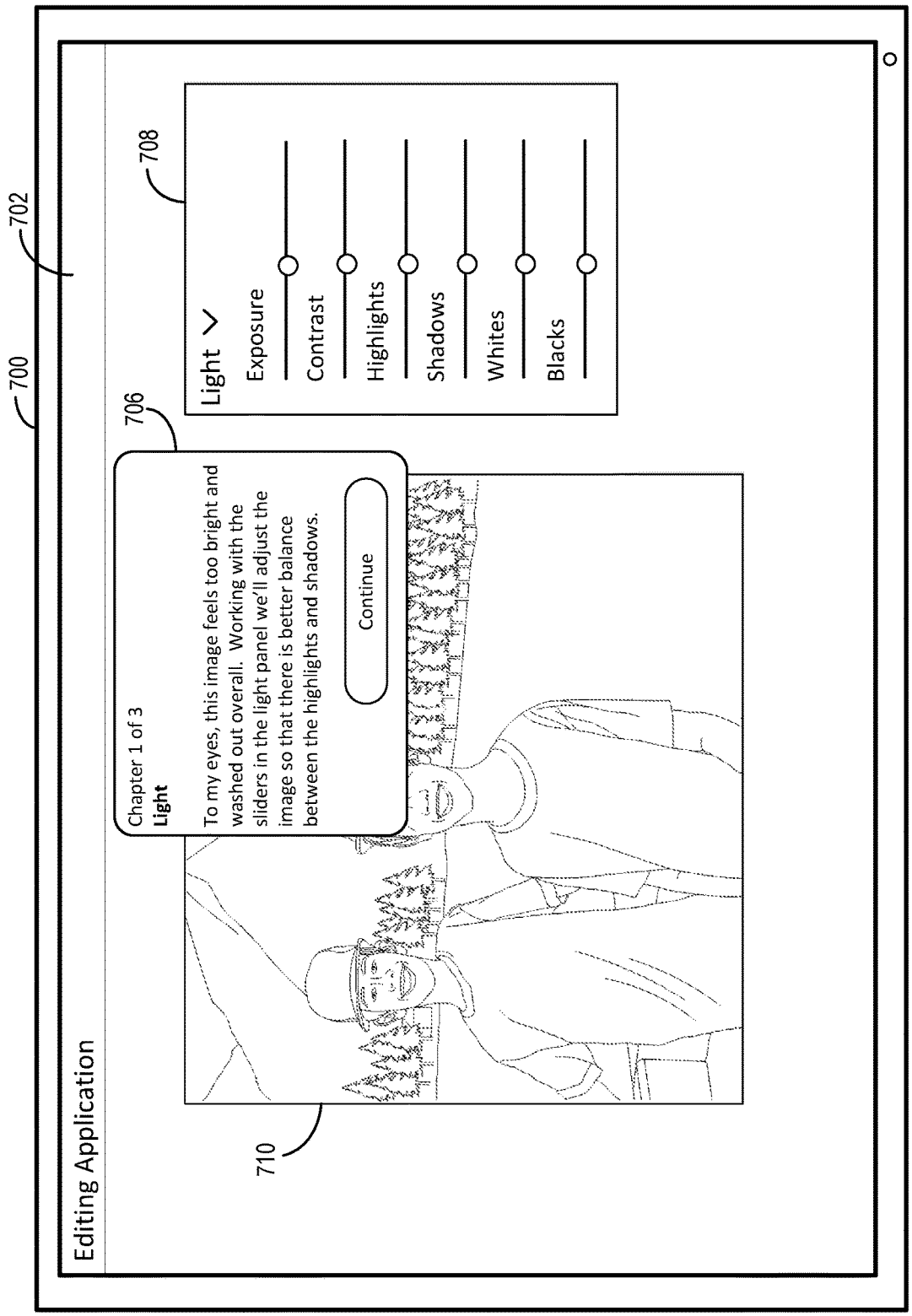

FIG. 7B illustrates the client device 700 displaying the selected digital content tutorial within the digital editing application 702. Specifically, the client device 700 communicates with the tutorial customization system 102 to customize the selected digital content tutorial for a user of the device based on the user's tool usage associated with the digital content tutorial. For instance, the tutorial customization system 102 accesses a mapping generated by the tutorial customization system 102 for the user to provide a customized digital content tutorial. The client device 700 displays the customized digital content tutorial including selected versions of the portions that meet the user's needs based on the user's proficiency with tools corresponding to portions of the selected digital content tutorial. To illustrate, for a beginner user of the client device 700, the tutorial customization system 102 generates a customized digital content tutorial to include the most detailed versions (e.g., beginner level versions) of the various portions and provides the customized digital content tutorial for display at the client device 700.

As shown in FIG. 7B, the client device 700 obtains tutorial content based on the customized digital content tutorial to display. For example, the client device 700 obtains, for display within the graphical user interface, a first text message 706 associated with a first set of tools 708 corresponding to a first portion of the digital content tutorial. To illustrate, the first portion of the digital content tutorial can relate to modifying lighting in a digital image 710 within the digital editing application 702. Accordingly, the first set of tools 708 includes a plurality of tools for modifying different lighting attributes of the digital image 710. In one or more embodiments, the first text message 706 includes an introduction to the digital content tutorial and/or the first portion of the digital content tutorial.

Figure 7C:
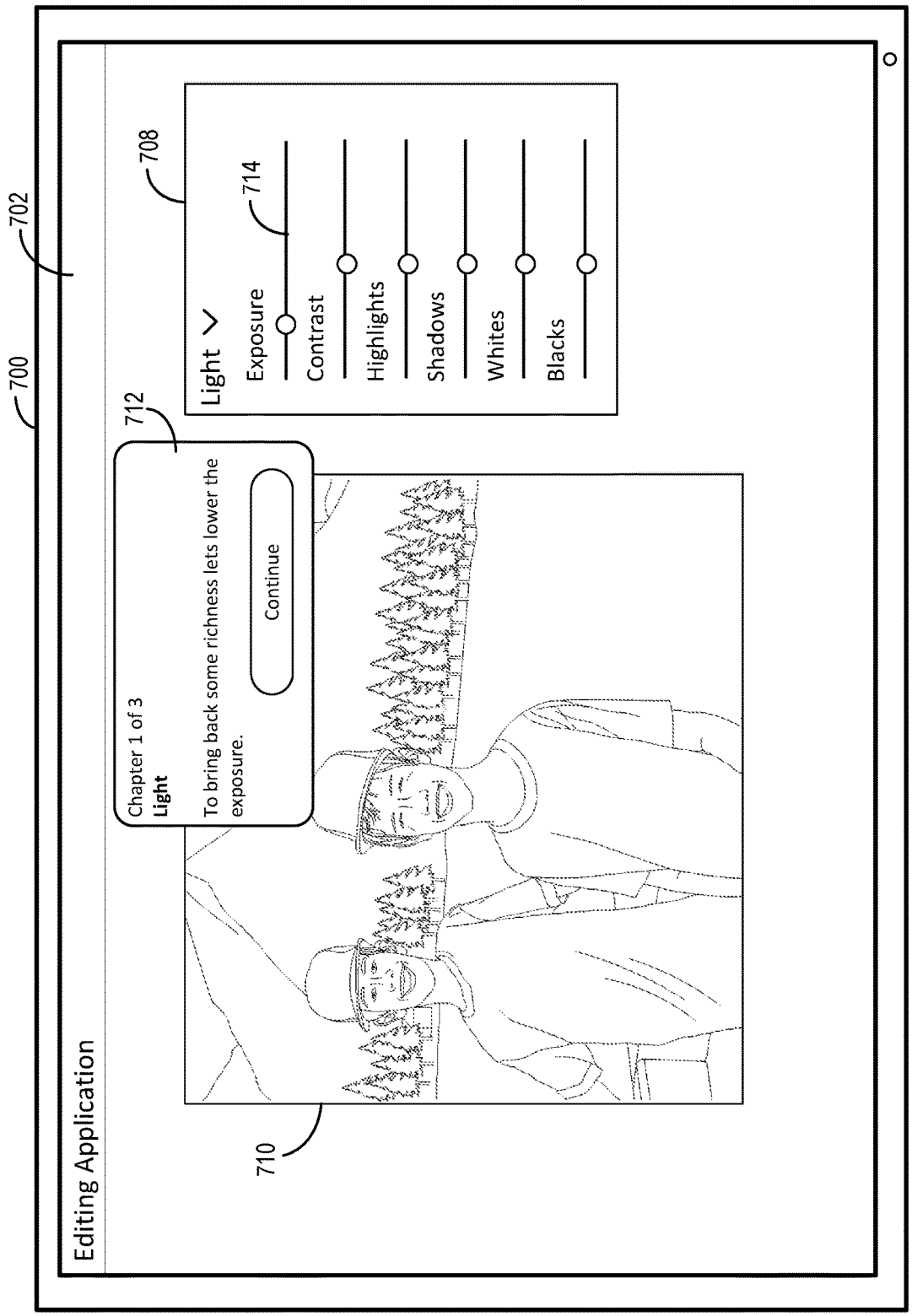

FIG. 7C illustrates the client device 700 displaying a second message 712 corresponding to the first portion of the digital content tutorial. Specifically, the client device 700 accesses tutorial content associated with a first step of performing a sub-task in the digital content tutorial. For instance, the client device 700 displays the second message 712 including text instructions for modifying a first tool 714 in the first set of tools 708. To illustrate, the first tool 714 includes an exposure tool for adjusting an exposure corresponding to lighting in the digital image 710. In one or more embodiments, the digital content tutorial also displays one or more visual indicators of a setting for the first tool 714 (e.g., by highlighting a target position of a slider for the first tool 714). Although not shown, the client device 700 proceeds with displaying additional tutorial content related to utilizing the remaining tools in the first set of tools 708 in connection with the first portion of the digital content tutorial.

Figure 7D:
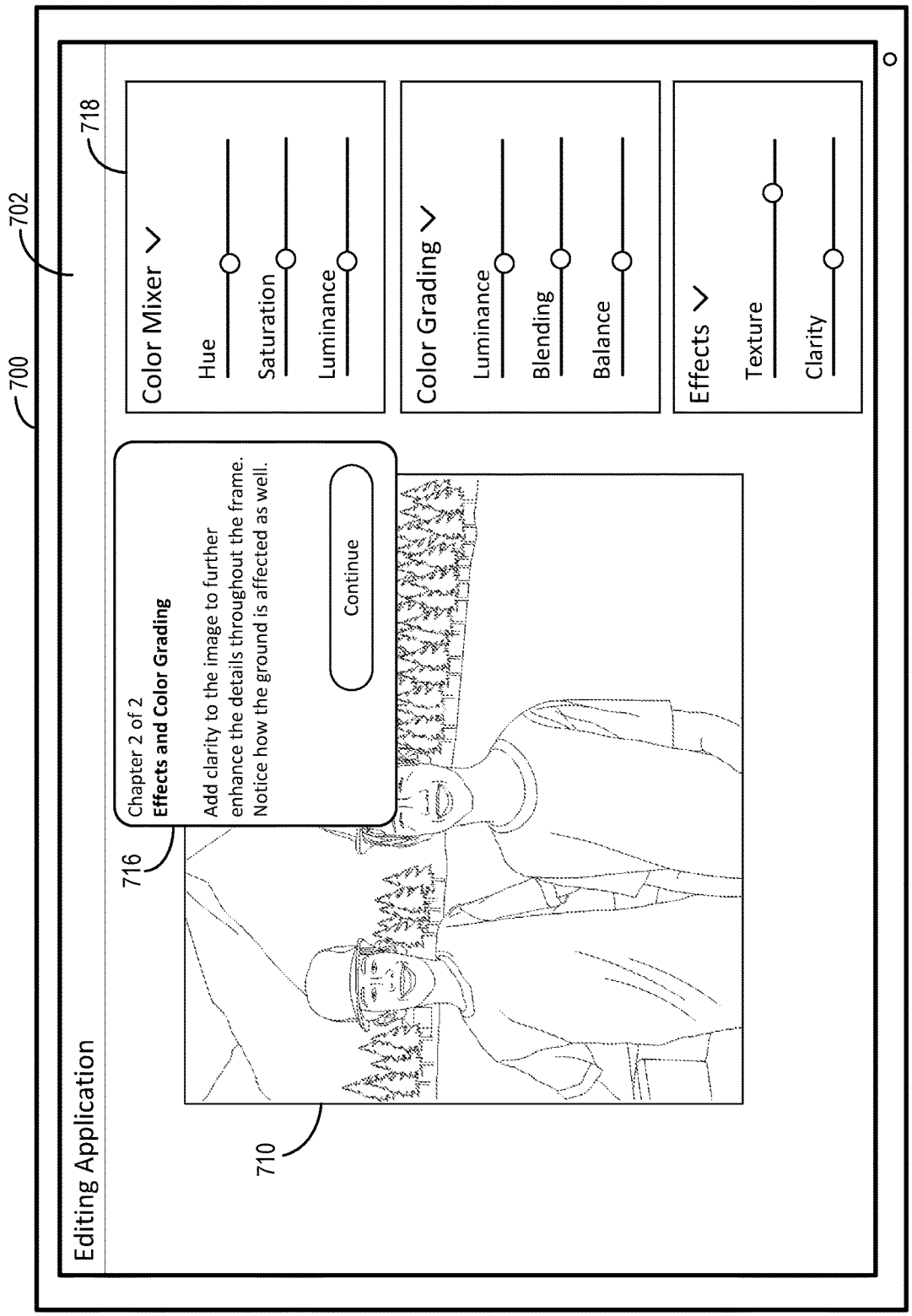

As mentioned, for a beginner user, the tutorial customization system 102 generates a customized digital content tutorial that includes the most detailed tutorial content for instructing a user to use all of the tools associated with the different portions of the digital content tutorial. Accordingly, FIG. 7D illustrates that the client device 700 displays a third text message 716 including an introduction to a second portion of the customized digital content tutorial. In connection with the second portion of the customized digital content tutorial, for example, the client device 700 displays the third text message 716 and additional tutorial content for performing various sub-tasks via a second set of tools 718 corresponding to modifying colors or texture effects associated with the digital image 710.

Figure 8:
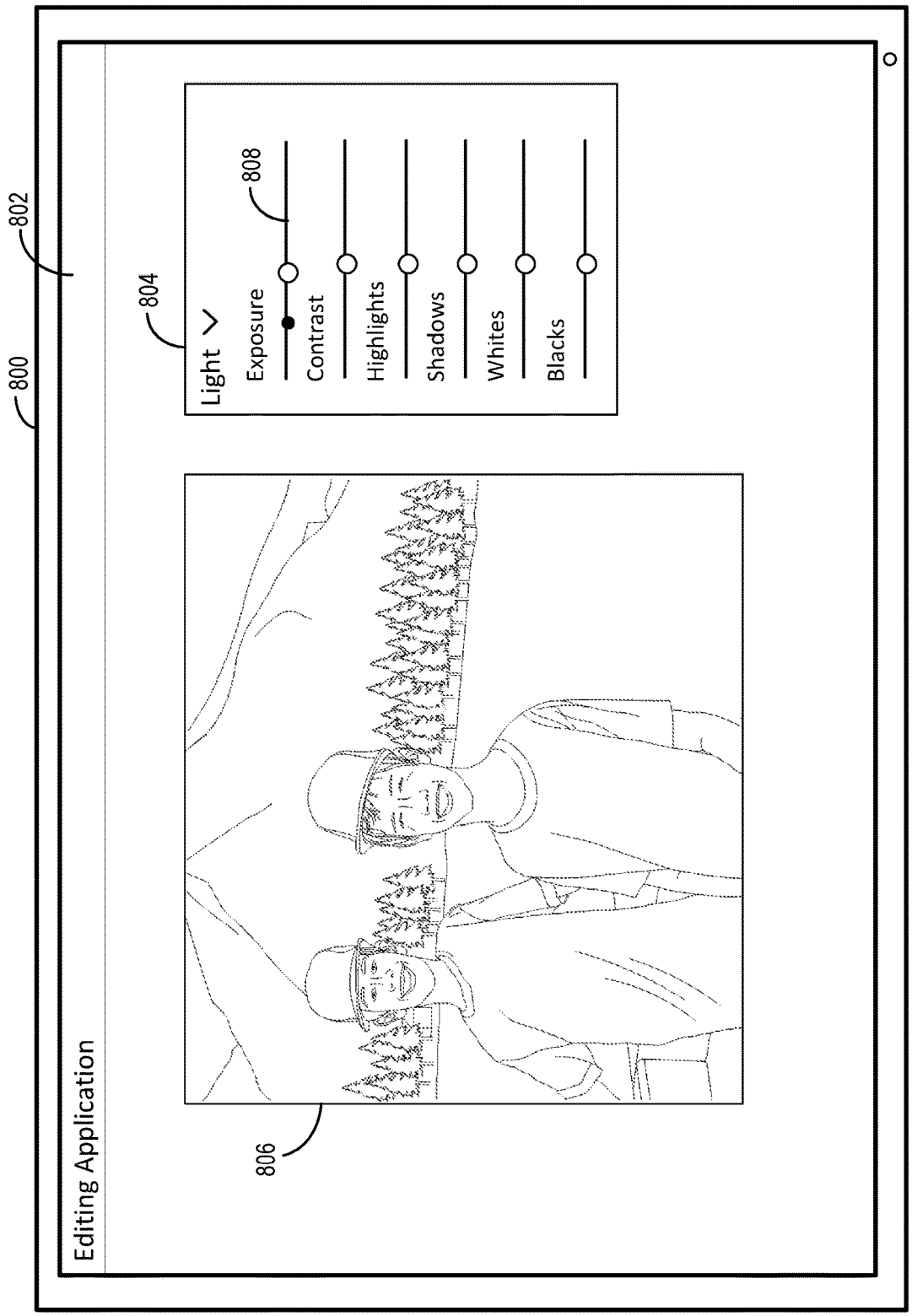
FIG. 8 illustrates an additional graphical user interface for providing an additional customized digital content tutorial for an additional user in accordance with one or more implementations.

In one or more embodiments, as previously described, the tutorial customization system 102 generates a different customized digital content tutorial covering the same topic for a user with different levels of experience than the beginner user of FIGS. 7A-7D. FIG. 8 illustrates a graphical user interface of a client device 800 including a digital editing application 802 for displaying an additional customized digital content tutorial. Specifically, the tutorial customization system 102 generates a customized digital content tutorial for a user with an intermediate or expert level of experience with one or more tools.

As illustrated in FIG. 8, in response to initiating the customized digital content tutorial, the client device 800 accesses tutorial content for a first portion of the digital content tutorial based on the user's intermediate/expert level of experience with a first set of tools 804. To illustrate, the first set of tools 804 of FIG. 8 correspond to the first set of tools 708 of FIG. 7B. Although the first portion of the digital content tutorial corresponds to the same set of tools for a beginner user or an intermediate/expert user, the tutorial customization system 102 selects different tutorial content for providing in a customized digital content tutorial according to the level of experience.

Specifically, because the user of the client device 800 has a higher proficiency with the first set of tools 804, the client device 800 does not display any textual messages in connection with performing one or more sub-tasks associated with editing a digital image 806. Rather, the client device displays simpler tutorial content for utilizing a first tool 808 of the first set of tools 804. To illustrate, the client device 800 displays tutorial content indicated by a selected version of the first portion of the digital content tutorial by displaying an indicator of a target value on a slider corresponding to the first tool 808. The client device 800 can similarly display target values for other tools in the first set of tools 804 without displaying additional text messages due to the user's intermediate/expert proficiency level.

In additional embodiments, although the user has an intermediate/expert level of proficiency with tools corresponding to the first portion of the digital content tutorial, the user may have a lower experience level with tools of one or more other portions of the digital content tutorial. To illustrate, in response to determining that the user has a beginner's level of proficiency with tools of the second portion related to color/texture effects, the tutorial customization system 102 generates the customized digital content tutorial to include a version targeting beginner users for the second portion. Thus, when displaying tutorial content for the second portion, the client device 800 displays text messages and/or other tutorial content similar to the tutorial content described above with respect to FIG. 7D. Accordingly, the tutorial customization system 102 provides dynamically customizable digital content tutorials that target a user's individual proficiency with different tools in a digital editing application.

In one or more embodiments, for displaying tutorial content associated with a customized digital content tutorial, a client device accesses metadata associated with the digital content tutorial to determine the tutorial content to display at each step of a particular portion. Specifically, the metadata can include digital content (or a description of digital content) to provide to a client device in connection with executing the digital content tutorial. For instance, in response to extracting a step for a particular version of a portion of the digital content tutorial, the client device determines whether to provide text, image(s), video, audio, or a combination thereof for display in connection with the step. To illustrate, the tutorial customization system 102 determines text to display directly from the metadata (e.g., stored within the portion of the metadata referring to the corresponding step).

Alternatively, the client device determines digital content to access from a separate file, device, or system in connection with the digital content tutorial. For example, the client device obtains a link to or location of the relevant content stored a separate content management system and accesses the digital content from the separate content management system on-demand. In some embodiments, the client device determines whether to store the digital content at the client device or fetch the digital content from a separate source on-demand based on system requirements and capabilities of the client device indicated with a given version of the customized digital content tutorial.

Figure 9:
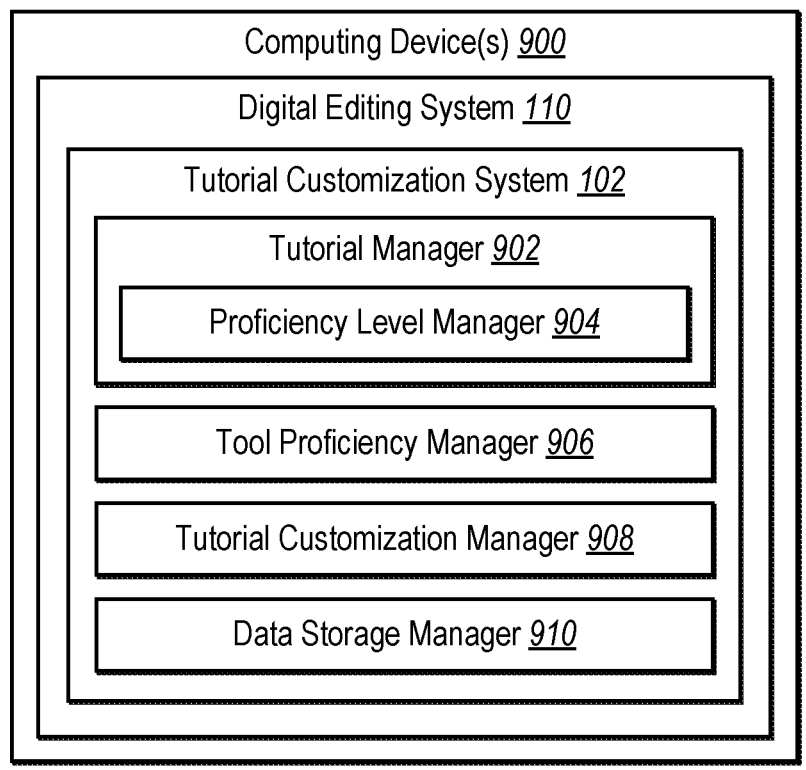
FIG. 9 illustrates a diagram of the tutorial customization system of FIG. 1 in accordance with one or more implementations.

FIG. 9 illustrates a detailed schematic diagram of an embodiment of the tutorial customization system 102 described above. As shown, the tutorial customization system 102 is implemented in a digital editing system 110 on computing device(s) 900 (e.g., a client device and/or server device as described in FIG. 1, and as further described below in relation to FIG. 11). Additionally, the tutorial customization system 102 includes, but is not limited to, a tutorial manager 902 that includes a proficiency level manager 904, a tool proficiency manager 906, a tutorial customization manager 908, and a data storage manager 910. The tutorial customization system 102 can be implemented on any number of computing devices. For example, the tutorial customization system 102 can be implemented in a distributed system of server devices for digital content editing tasks. The tutorial customization system 102 can also be implemented within one or more additional systems. Alternatively, the tutorial customization system 102 can be implemented on a single computing device such as a single client device.

In one or more embodiments, each of the components of the tutorial customization system 102 is in communication with other components using any suitable communication technologies. Additionally, the components of the tutorial customization system 102 are capable of being in communication with one or more other devices including other computing devices of a user, server devices (e.g., cloud storage devices), licensing servers, or other devices/systems. It will be recognized that although the components of the tutorial customization system 102 are shown to be separate in FIG. 9, any of the subcomponents may be combined into fewer components, such as into a single component, or divided into more components as may serve a particular implementation. Furthermore, although the components of FIG. 9 are described in connection with the tutorial customization system 102, at least some of the components for performing operations in conjunction with the tutorial customization system 102 described herein may be implemented on other devices within the environment.

In some embodiments, the components of the tutorial customization system 102 include software, hardware, or both. For example, the components of the tutorial customization system 102 include one or more instructions stored on a computer-readable storage medium and executable by processors of one or more computing devices (e.g., the computing device(s) 900). When executed by the one or more processors, the computer-executable instructions of the tutorial customization system 102 cause the computing device(s) 900 to perform the operations described herein. Alternatively, the components of the tutorial customization system 102 can include hardware, such as a special purpose processing device to perform a certain function or group of functions. Additionally, or alternatively, the components of the tutorial customization system 102 can include a combination of computer-executable instructions and hardware.

Furthermore, the components of the tutorial customization system 102 performing the functions described herein with respect to the tutorial customization system 102 may, for example, be implemented as part of a stand-alone application, as a module of an application, as a plug-in for applications, as a library function or functions that may be called by other applications, and/or as a cloud-computing model. Thus, the components of the tutorial customization system 102 may be implemented as part of a stand-alone application on a personal computing device or a mobile device. Alternatively, or additionally, the components of the tutorial customization system 102 may be implemented in any application that provides digital image modification, including, but not limited to ADOBE® PHOTOSHOP®, ADOBE® LIGHTROOM®, ADOBE® ILLUSTRATOR®, and ADOBE® CREATIVE CLOUD®.

The tutorial customization system 102 includes a tutorial manager 902 to manage digital content tutorials associated with one or more digital editing applications. For example, the tutorial manager 902 determines possible configurations of a multi-level digital content tutorial including determining a plurality of portions of the digital content tutorial and separate versions of one or more of the portions of the digital content tutorial. Additionally, the tutorial manager 902 utilizes the proficiency level manager 904 to determine proficiency levels associated with versions of each portion of the digital content tutorial (e.g., by extracting the proficiency levels from metadata of the digital content tutorial).

The tutorial customization system 102 includes a tool proficiency manager 906 to determine tool proficiency of a user. For instance, the tool proficiency manager 906 accesses a user tool usage associated with a user for a plurality of tools of a digital editing application. The tool proficiency manager 906 utilizes the user tool usage to generate tool proficiency scores for the tools of the digital editing application. Additionally, the tool proficiency manager 906 utilizes the tool proficiency scores of individual tools to generate combined tool proficiency scores for tools associated with portions of a digital content tutorial.

The tutorial customization system 102 also includes a tutorial customization manager 908 to generate customizes digital content tutorials for users. Specifically, the tutorial customization manager 908 utilizes the tool proficiency scores and proficiency levels to generate mappings of versions of different portions of a digital content tutorial to different users. The tutorial customization manager 908 utilizes the generated mappings to generate customized digital content tutorials including different tutorial content targeting users with different tool proficiencies/experience.

The tutorial customization system 102 also includes a data storage manager 910 (that comprises a non-transitory computer memory/one or more memory devices) that stores and maintains data associated with customizing digital content tutorials. For example, the data storage manager 910 stores data associated with digital content tutorials and user tool usage. To illustrate, the data storage manager 910 stores portions of digital content tutorials, versions associated with portions of digital content tutorials, proficiency levels of different versions of portions of digital content tutorials, tool proficiency scores associated with users, and mappings for users and customized digital content tutorials.

Figure 10:
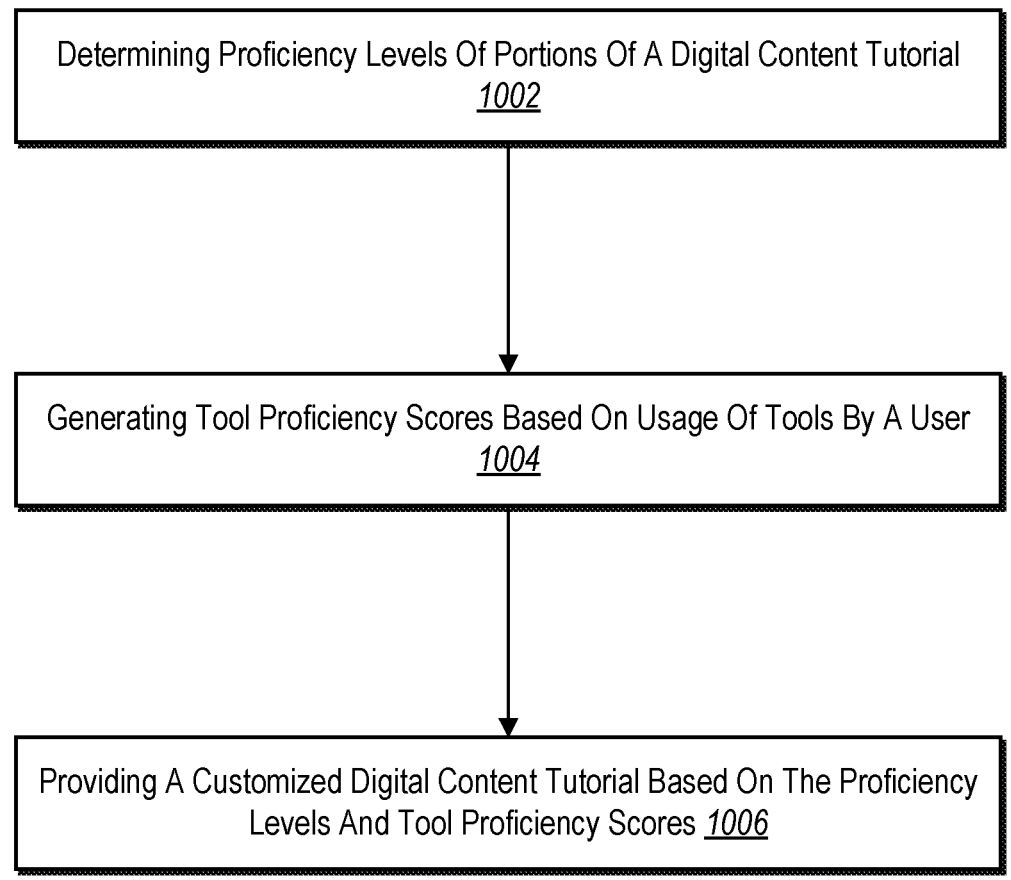
FIG. 10 illustrates a flowchart of a series of acts for customizing a digital content tutorial based on usage of tools within a digital editing application in accordance with one or more implementations.

Turning now to FIG. 10, this figure shows a flowchart of a series of acts 1000 of customizing a digital content tutorial based on usage of tools within a digital editing application. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10.

As shown, the series of acts 1000 includes an act 1002 of determining proficiency levels of portions of a digital content tutorial. For example, act 1002 involves determining a plurality of proficiency levels for portions of a digital content tutorial associated with a digital editing application. Act 1002 can involve determining a plurality of chapters of the digital content tutorial corresponding to subtopics of a topic associated with the digital content tutorial. Act 1002 can also involve determining a set of proficiency levels for different versions of a chapter of the plurality of chapters.

Act 1002 can involve determining a plurality of versions of a portion of the digital content tutorial. Act 1002 can involve determining a first proficiency level for a first version of the plurality of versions. Act 1002 can involve determining a second proficiency level for a second version of the plurality of versions.

Act 1002 can involve determining a first version of the chapter comprising a first set of steps involving one or more tools in the digital editing application. Act 1002 can involve determining a second version of the chapter comprising a second set of steps involving the one or more tools in the digital editing application. Act 1002 can also involve determining a first proficiency level for the first version and a second proficiency level for the second version, the first proficiency level being different than the second proficiency level.

Act 1002 can involve determining that the first set of steps of the first version has more steps than the second set of steps of the second version. Act 1002 can also involve determining the second proficiency level having a higher proficiency value than the first proficiency level in connection with the first set of steps having more steps than the second set of steps.

Act 1002 can involve extracting data associated with the plurality of chapters of the digital content tutorial from metadata associated with the digital content tutorial. Act 1002 can further involve determining the plurality of proficiency levels and versions of the plurality of chapters based on the extracted data. Act 1002 can involve determining, from metadata associated with the digital content tutorial, a first set of proficiency levels corresponding to a plurality of versions of a first portion of the digital content tutorial. Act 1002 can also involve determining, from the metadata associated with the digital content tutorial, a second set of proficiency levels corresponding to plurality of versions of a second portion of the digital content tutorial.

The series of acts 1000 also includes an act 1004 of generating tool proficiency scores based on usage of tools by a user. For example, act 1004 involves generating tool proficiency scores associated with a user of a client device based on usage of a plurality of tools corresponding to the portions of the digital content tutorial within the digital editing application. Act 1004 can involve generating a tool proficiency score of the user with the one or more tools associated with the chapter in the digital editing application.

Act 1004 can involve determining one or more tools for performing a task corresponding to a portion of the digital content tutorial. Act 1004 can involve generating, in connection with the portion, a tool proficiency score based on usage of the one or more tools for performing the task in connection with a user account of the user. Act 1004 can also involve generating the tool proficiency score based on correct usage of the one or more tools for performing the task in connection with the user account of the user.

Act 1004 can involve generating a first tool proficiency score associated with the user for a first tool of the one or more tools. Act 1004 can involve generating a second tool proficiency score associated with the user for a second tool of the one or more tools. Act 1004 can also involve generating the tool proficiency score for the particular portion by averaging the first tool proficiency score and the second tool proficiency score.

Act 1004 can involve determining a first weight associated with a first tool of the one or more tools and a second weight associated with a second tool of the one or more tools. Act 1004 can also involve generating the tool proficiency score based on the first weight associated with the first tool and the second weight associated with the second tool and the usage of the one or more tools.

Additionally, the series of acts 1000 includes an act 1006 of providing a customized digital content tutorial based on the proficiency levels and tool proficiency scores. For example, act 1006 involves providing, for display at the client device, a customized digital content tutorial by selecting a subset of the portions of the digital content tutorial based on the plurality of proficiency levels and the tool proficiency scores associated with the user.

Act 1006 can involve determining a plurality of tutorial content items corresponding to sets of steps from the subset of the portions of the digital content tutorial by accessing metadata associated with the digital content tutorial. Act 1006 can further involve providing, for display within the digital editing application at the client device, the plurality of tutorial content items corresponding to the sets of steps according to a tutorial order of the digital content tutorial.

Act 1006 can involve determining, in response to selecting the subset of the portions of the digital content tutorial, one or more digital content items corresponding to the subset of the portions stored at a content management system. Act 1006 can involve obtaining the one or more digital content items from the content management system. Act 1006 can also involve providing, for display within the digital editing application at the client device, the one or more digital content items in connection with one or more steps of the digital content tutorial.

Act 1006, or an additional act, can involve generating a mapping based on the tool proficiency scores associated with the user relative to a subset of the portions based on the plurality of proficiency levels of the portions. Act 1006 can also involve providing a customized digital content tutorial comprising the subset of the portions of the digital content tutorial according to the mapping. For example, act 1006 can involve generating a mapping comprising the version of the particular portion of the digital content tutorial by determining that the tool proficiency score associated with the user meets the proficiency level corresponding to the version of the particular portion. Act 1006 can also involve providing digital content associated with the version of the particular portion for display within the digital editing application.

Act 1006 can involve comparing, for a portion of the portions, a tool proficiency score of the tool proficiency scores to the first proficiency level and the second proficiency level. Act 1006 can involve generating the mapping comprising one of the first version or the second version in response to determining that the tool proficiency score meets the first proficiency level or the second proficiency level.

Act 1006 can involve comparing the tool proficiency scores to proficiency levels of a plurality of versions of a plurality of chapters of the digital content tutorial. Act 1006 can involve generating the mapping comprising a single version for each chapter of the plurality of chapters based on the tool proficiency scores relative to the plurality of proficiency levels of the plurality of versions.

Act 1006 can involve determining, based on the mapping, first digital content corresponding to a selected version of a first portion of the digital content tutorial. Act 1006 can involve determining, based on the mapping, second digital content corresponding to a selected version of a second portion of the digital content tutorial. Act 1006 can further involve providing the customized digital content tutorial comprising the first digital content and the second digital content according to a tutorial order of the digital content tutorial.

The series of acts 1000 can include determining the subset of the portions of the digital content tutorial by comparing the tool proficiency score associated with the user to the first proficiency level of the first version and the second proficiency level of the second version. The series of acts 1000 can also include selecting, from the first version and the second version, a version to include in the customized digital content tutorial in response to determining that the tool proficiency score associated with the user is higher than the first proficiency level or the second proficiency level.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
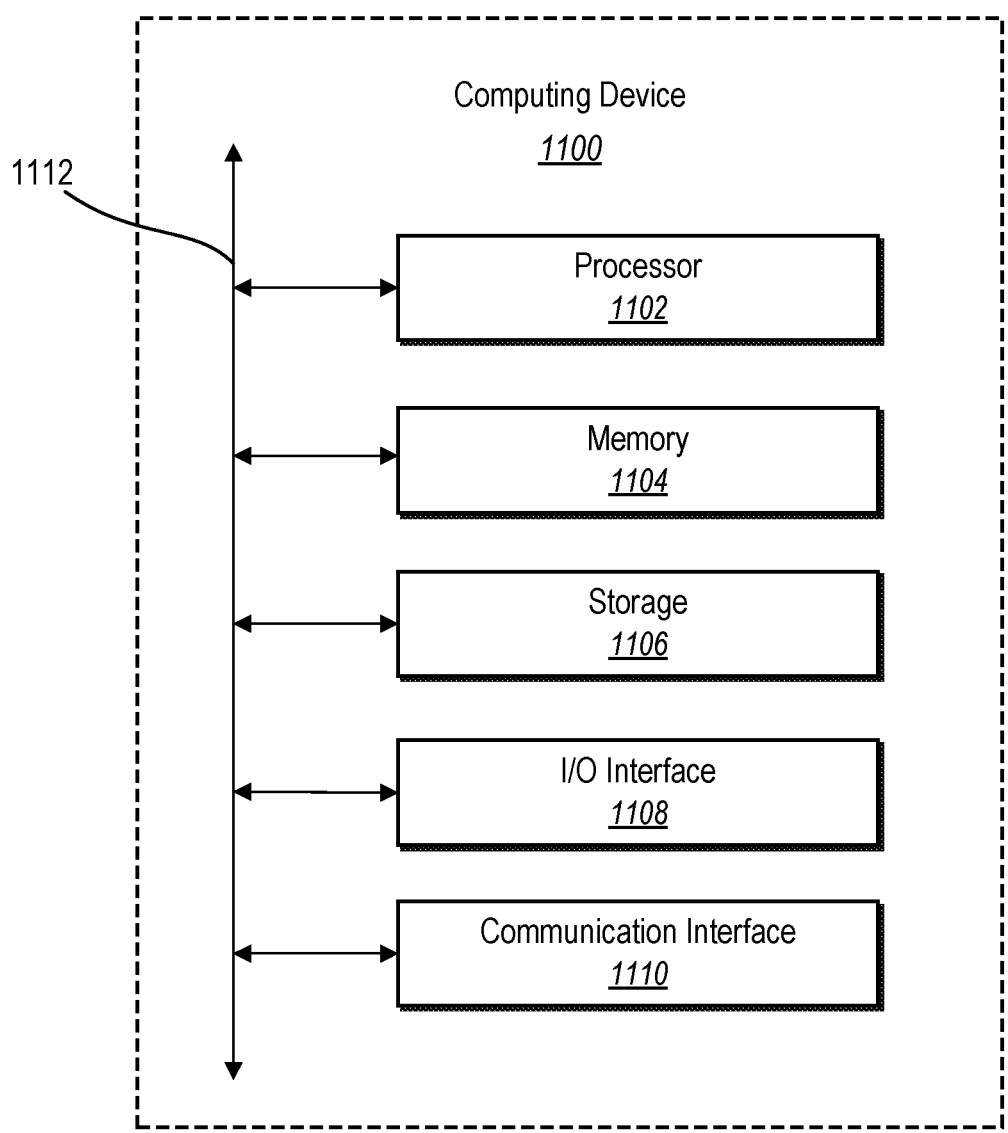
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
    determining, by at least one processor, a plurality of proficiency levels for portions of a digital content tutorial associated with a digital editing application by:
        determining a plurality of chapters of the digital content tutorial corresponding to subtopics of a topic associated with the digital content tutorial; and
        determining a set of proficiency levels for different versions of a chapter of the plurality of chapters;
    generating, by the at least one processor, tool proficiency scores associated with a user of a client device based on usage of a plurality of tools corresponding to the portions of the digital content tutorial within the digital editing application;
    selecting a particular version of a plurality of versions of a particular portion of the digital content tutorial in response to comparing the tool proficiency scores to proficiency levels of the plurality of versions of the particular portion, the particular portion of the digital content tutorial corresponding to the chapter of the plurality of chapters; and
    providing, by the at least one processor for display at the client device, a customized digital content tutorial by selecting a subset of the portions of the digital content tutorial based on the plurality of proficiency levels and the tool proficiency scores associated with the user, the subset comprising the particular version of the particular portion.

2. The computer-implemented method of claim 1, wherein determining the plurality of proficiency levels comprises:
    generating tool proficiency scores associated with an additional user of an additional client device based on usage of the plurality of tools corresponding to the portions of the digital content tutorial within the digital editing application; and
    selecting, for the additional user, an additional version of the plurality of versions of the particular portion of the digital content tutorial in response to comparing the tool proficiency scores to proficiency levels of the plurality of versions of the particular portion.

3. The computer-implemented method of claim 1, wherein determining the set of proficiency levels for the different versions of the chapter comprises:
  determining a first version of the chapter comprising a first set of steps involving one or more tools in the digital editing application;
  determining a second version of the chapter comprising a second set of steps involving the one or more tools in the digital editing application; and
  determining a first proficiency level for the first version and a second proficiency level for the second version, the first proficiency level being different than the second proficiency level.

4. The computer-implemented method of claim 3, wherein generating the tool proficiency scores associated with the user comprises generating a tool proficiency score of the user with the one or more tools associated with the chapter in the digital editing application.

5. The computer-implemented method of claim 4, wherein selecting the particular version comprises:
  determining the subset of the portions of the digital content tutorial by comparing the tool proficiency score associated with the user to the first proficiency level of the first version and the second proficiency level of the second version; and
  selecting, from the first version and the second version, the particular version to include in the customized digital content tutorial in response to determining that the tool proficiency score associated with the user is higher than the first proficiency level or the second proficiency level.

6. The computer-implemented method of claim 3, wherein determining the set of proficiency levels for the different versions of the chapter comprises:
  determining that the first set of steps of the first version has more steps than the second set of steps of the second version; and
  determining the second proficiency level having a higher proficiency value than the first proficiency level in connection with the first set of steps having more steps than the second set of steps.

7. The computer-implemented method of claim 1, wherein determining the plurality of proficiency levels comprises:
  extracting data associated with the plurality of chapters of the digital content tutorial from metadata associated with the digital content tutorial; and
  determining the plurality of proficiency levels and versions of the plurality of chapters based on the extracted data.

8. The computer-implemented method of claim 1, wherein providing the customized digital content tutorial comprises:
  determining a plurality of tutorial content items corresponding to sets of steps from the subset of the portions of the digital content tutorial by accessing metadata associated with the digital content tutorial; and
  providing, for display within the digital editing application at the client device, the plurality of tutorial content items corresponding to the sets of steps according to a tutorial order of the digital content tutorial.

9. The computer-implemented method of claim 1, wherein providing the customized digital content tutorial comprises:
  determining, in response to selecting the subset of the portions of the digital content tutorial, one or more digital content items corresponding to the subset of the portions stored at a content management system;
  obtaining the one or more digital content items from the content management system; and
  providing, for display within the digital editing application at the client device, the one or more digital content items in connection with one or more steps of the digital content tutorial.

10. A system comprising:
  a memory component; and
  a processing device coupled to the memory component, the processing device to perform operations comprising:
    determining a plurality of proficiency levels for portions of a digital content tutorial associated with a digital editing application by:
      determining a plurality of chapters of the digital content tutorial corresponding to subtopics of a topic associated with the digital content tutorial; and
      determining a set of proficiency levels for different versions of a chapter of the plurality of chapters;
    generating tool proficiency scores associated with a user of a client device based on usage of a plurality of tools corresponding to the portions of the digital content tutorial within the digital editing application;
    selecting a particular version of a plurality of versions of a particular portion of the digital content tutorial in response to comparing the tool proficiency scores to proficiency levels of the plurality of versions of the particular portion, the particular portion of the digital content tutorial corresponding to the chapter of the plurality of chapters;
    generating a mapping based on the tool proficiency scores associated with the user relative to a subset of the portions based on the plurality of proficiency levels of the portions, the subset comprising the particular version of the particular portion; and
    providing, for display at the client device, a customized digital content tutorial comprising the subset of the portions of the digital content tutorial according to the mapping.

11. The system of claim 10, wherein determining the plurality of proficiency levels comprises:
  determining a first proficiency level for a first version of the plurality of versions; and
  determining a second proficiency level for a second version of the plurality of versions.

12. The system of claim 11, wherein generating the mapping comprises:
  comparing, for the particular portion of the portions, a tool proficiency score of the tool proficiency scores to the first proficiency level and the second proficiency level; and
  generating the mapping comprising one of the first version or the second version in response to determining that the tool proficiency score meets the first proficiency level or the second proficiency level.

13. The system of claim 10, wherein generating the mapping comprises:
  comparing the tool proficiency scores to proficiency levels of a plurality of versions of the plurality of chapters of the digital content tutorial; and
  generating the mapping comprising a single version for each chapter of the plurality of chapters based on the tool proficiency scores relative to the plurality of proficiency levels of the plurality of versions.

14. The system of claim 10, wherein generating the tool proficiency scores associated with the user comprises:
- determining one or more tools for performing a task corresponding to a portion of the digital content tutorial; and
- generating, in connection with the portion, a tool proficiency score based on usage of the one or more tools for performing the task in connection with a user account of the user.

15. The system of claim 14, wherein generating the tool proficiency score associated with the user comprises:
- determining a first weight associated with a first tool of the one or more tools and a second weight associated with a second tool of the one or more tools; and
- generating the tool proficiency score based on the first weight associated with the first tool and the second weight associated with the second tool and the usage of the one or more tools.

16. The system of claim 14, wherein providing the customized digital content tutorial comprises:
- determining, based on the mapping, first digital content corresponding to a selected version of a first portion of the digital content tutorial;
- determining, based on the mapping, second digital content corresponding to a selected version of a second portion of the digital content tutorial; and
- providing the customized digital content tutorial comprising the first digital content and the second digital content according to a tutorial order of the digital content tutorial.

17. A non-transitory computer-readable medium storing executable instructions, which when executed by a processing device, cause the processing device to perform operations comprising:
- determining, by at least one processor, a plurality of proficiency levels for portions of a digital content tutorial associated with a digital editing application by:
  - determining a plurality of chapters of the digital content tutorial corresponding to subtopics of a topic associated with the digital content tutorial; and
  - determining a set of proficiency levels for different versions of a chapter of the plurality of chapters;
- generating, by the at least one processor for a version of a plurality of versions of a particular portion of the portions, a tool proficiency score associated with a user of a client device based on usage of one or more tools corresponding to the particular portion of the digital content tutorial within the digital editing application;
- selecting the version of the plurality of versions of the particular portion of the digital content tutorial in response to comparing the tool proficiency score to proficiency levels of the plurality of versions of the particular portion, the particular portion of the digital content tutorial corresponding to the chapter of the plurality of chapters; and
- providing, by the at least one processor for display at the client device, a customized digital content tutorial comprising the version of the particular portion of the digital content tutorial based on a proficiency level corresponding to the version of the particular portion and the tool proficiency score associated with the user.

18. The non-transitory computer-readable medium of claim 17, wherein determining the plurality of proficiency levels for the portions of the digital content tutorial comprises:
- determining, from metadata associated with the digital content tutorial, a first set of proficiency levels corresponding to a first plurality of versions of a first portion of the digital content tutorial; and
- determining, from the metadata associated with the digital content tutorial, a second set of proficiency levels corresponding to a second plurality of versions of a second portion of the digital content tutorial.

19. The non-transitory computer-readable medium of claim 17, wherein generating the tool proficiency score associated with the user comprises:
- generating a first tool proficiency score associated with the user for a first tool of the one or more tools;
- generating a second tool proficiency score associated with the user for a second tool of the one or more tools; and
- generating the tool proficiency score for the particular portion by averaging the first tool proficiency score and the second tool proficiency score.

20. The non-transitory computer-readable medium of claim 17, wherein providing the customized digital content tutorial comprises:
- generating a mapping comprising the version of the particular portion of the digital content tutorial by determining that the tool proficiency score associated with the user meets the proficiency level corresponding to the version of the particular portion; and
- providing digital content associated with the version of the particular portion for display within the digital editing application.

* * * * *